United States Patent [19]

Himuro et al.

[11] Patent Number: 4,864,337
[45] Date of Patent: Sep. 5, 1989

[54] APPARATUS FOR DRIVING A MOVING MIRROR CYLINDER OF A CAMERA

[75] Inventors: Keiji Himuro; Kohichi Nishi, both of Yokohama, Japan

[73] Assignee: Ricoh Company, Ltd., Tokyo, Japan

[21] Appl. No.: 157,935

[22] Filed: Feb. 19, 1988

[30] Foreign Application Priority Data

Feb. 20, 1987 [JP] Japan .............................. 62-22686[U]

[51] Int. Cl.[4] ............................................ G03B 19/52
[52] U.S. Cl. .................................... 354/152; 354/202; 350/429
[58] Field of Search ................ 354/195.1, 195.12, 202, 354/400, 402, 403, 152; 350/429

[56] References Cited

U.S. PATENT DOCUMENTS 4,550,994 11/1985 Maruyama .......................... 354/402
4,728,977 3/1988 Yomogizawa et al. ........ 354/202 X
4,730,201 3/1988 Sasagaki ............................. 354/402

Primary Examiner—L. T. Hix
Assistant Examiner—David M. Gray
Attorney, Agent, or Firm—Oblon, Spivak, McClelland, Maier & Neustadt

[57] ABSTRACT

An apparatus for driving a moving lens barrel of a camera with a motor, the barrel supporting a photographing lens unit and retained mechanically and slidably with a camera body between a first setting position located in a forward direction of an optical axis of the lens unit and a second setting position located in a backward direction of the optical axis.

6 Claims, 22 Drawing Sheets

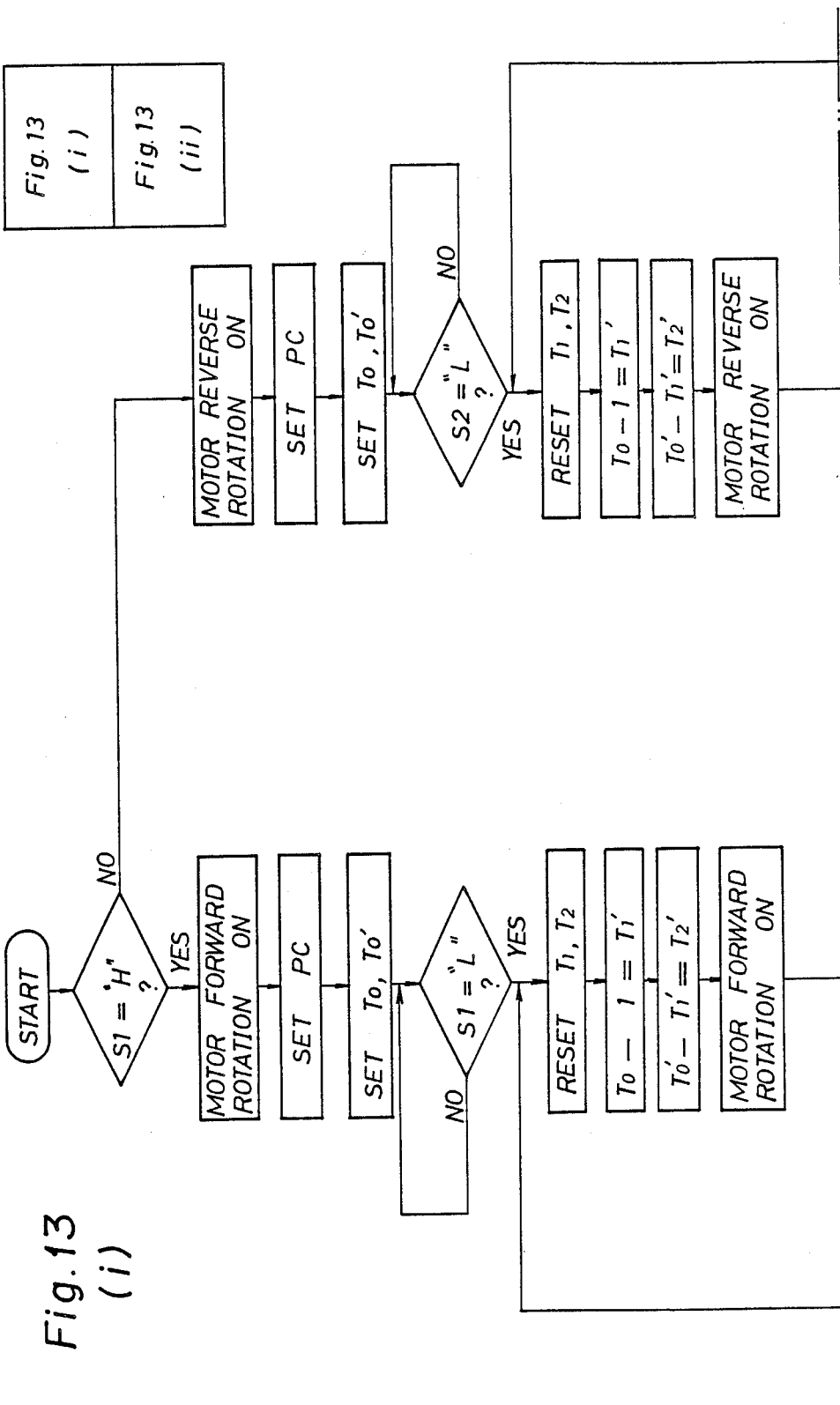

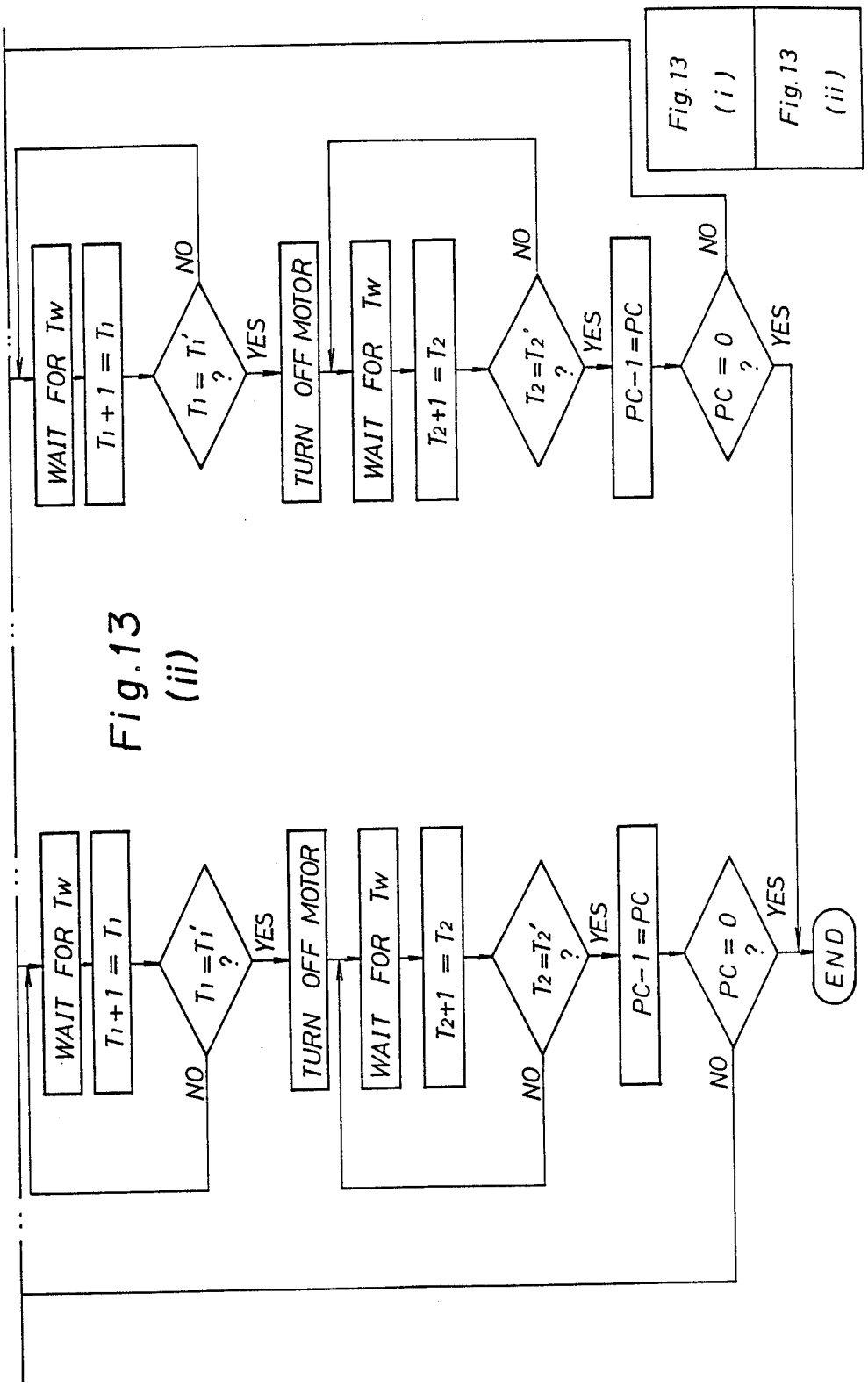

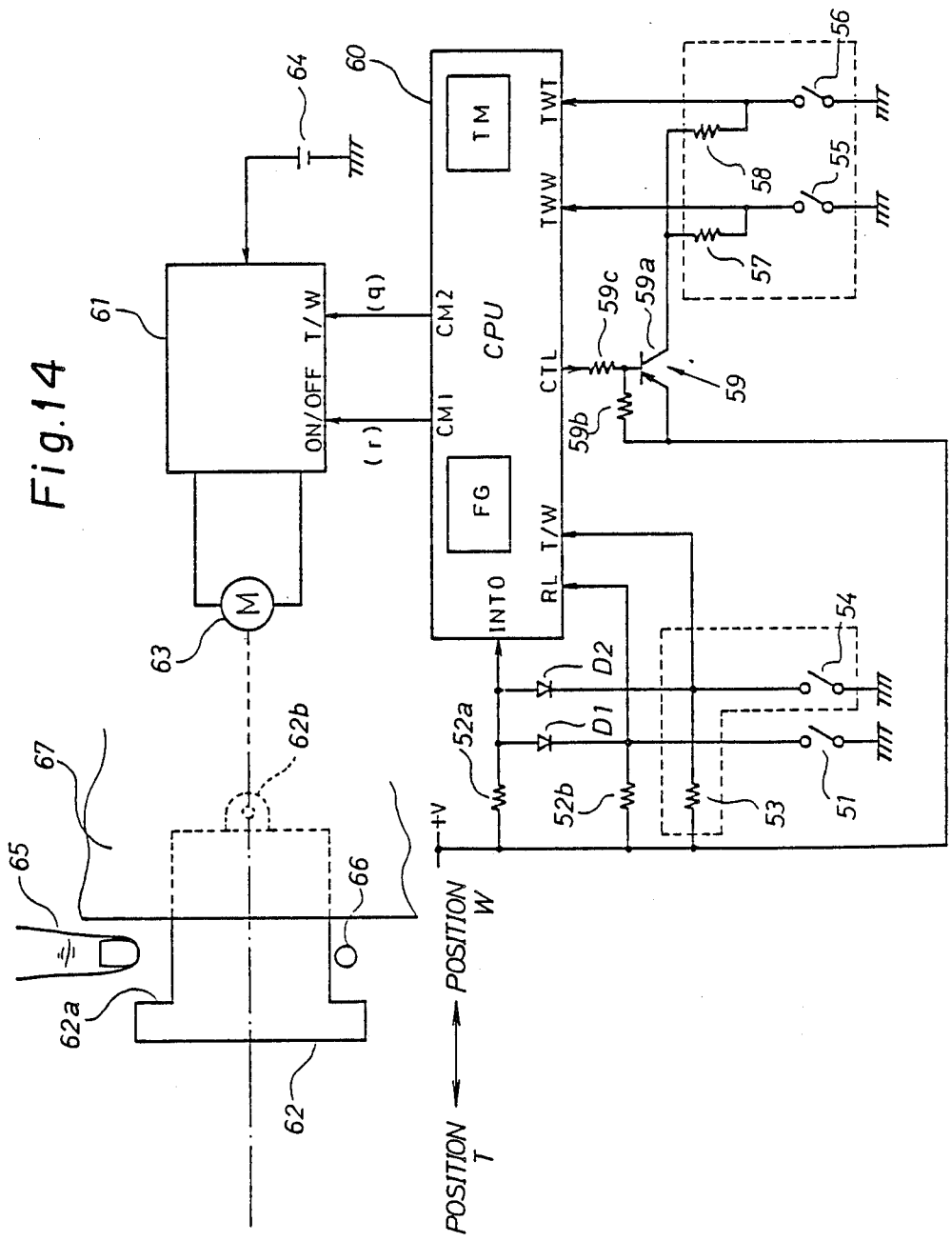

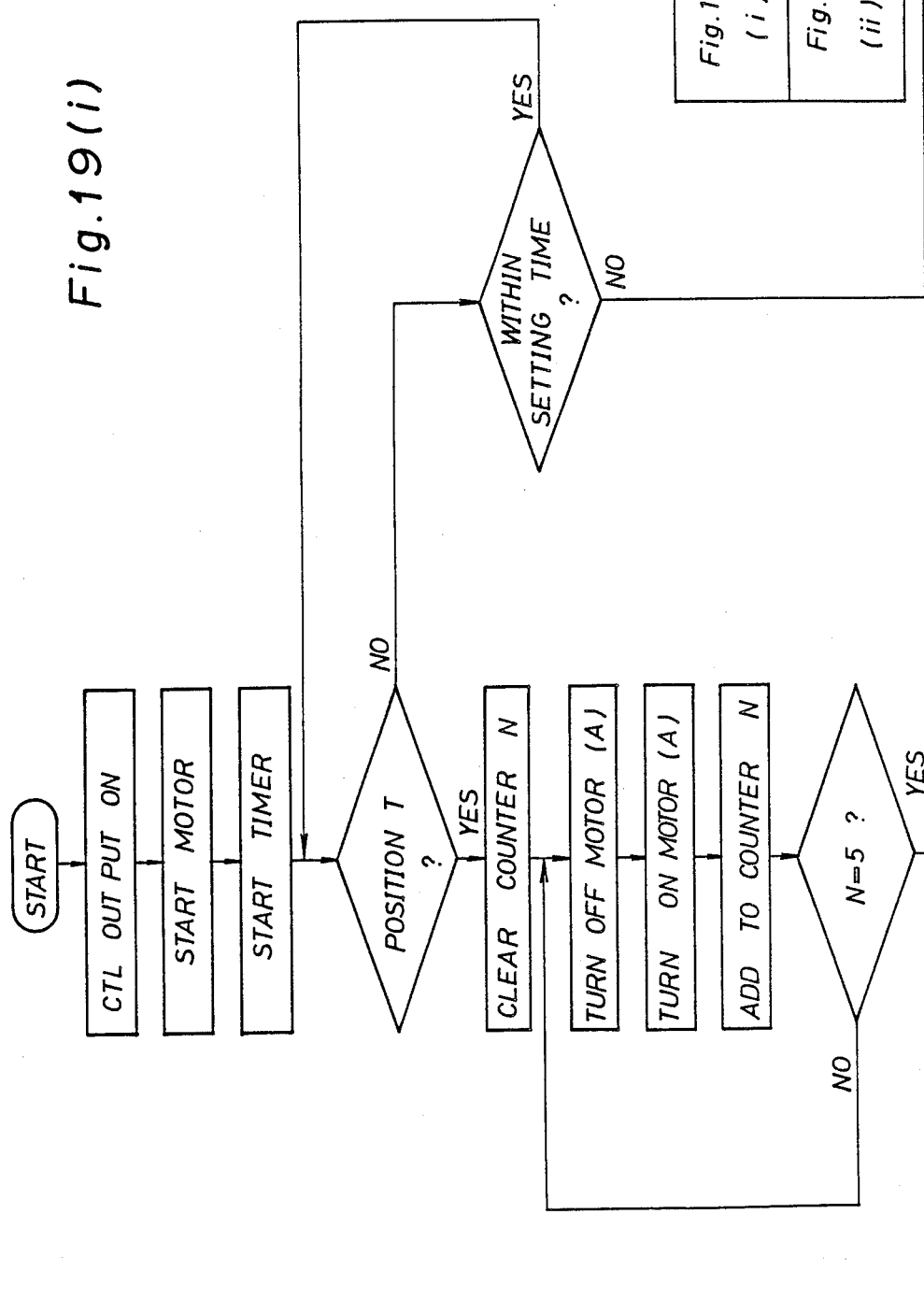

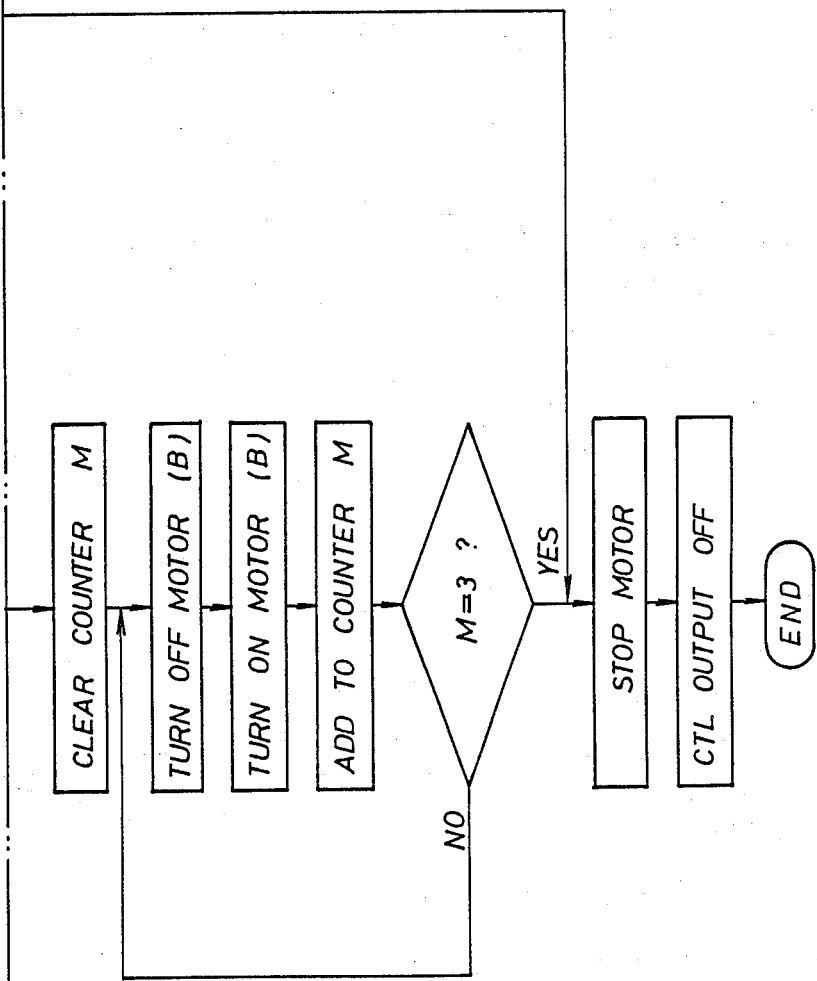

APPARATUS FOR DRIVING A MOVING MIRROR CYLINDER OF A CAMERA

BACKGROUND OF THE INVENTION

This invention relates to an apparatus for driving a moving mirror cylinder of a camera which supports a photographing lens unit and other related mechanisms, particulary an apparatus for driving the moving mirror cylinder or barrel to the first setting position located at a forward position along the optical axis or the second setting position located at the backward position along the axis
thereby to keep mechanically the setting position of the moving mirror cylinder.

When taking photographs, it is generally necessary to select a photographing lens with the most appropriate focal length that meets various types of photographers' compositions and intentions. There is a single-lens reflex camera with replaceable lenses to meet such requirements. By using such a single-lens reflex camera, almost all the compositions and intentions may be satisfied. However, a camera body is so large, and moreover the total volume become larger because an interchangeable lens must be accompanied by a lens mount and an iris-interlocking pin.

Usually, two of a wide-angle lens and a telescopic lens or two of a standard lens and a telescopic lens meet almost all the photographing requirements.

Therefore, lens shutter-type multi-focus cameras are launched on the market on the markets one after another. Generally speaking, this type of cameras incorporates a main lens system and a converter lens system in the camera body, with the main lens system being always arranged in the photographing optical axis while the converter lens system is adapted to be selectively inserted in this optical axis.

A focus distance selecting mechanism to be used in this type of multi-focus cameras is disclosed, for example, in the Japanese Opening No. 59-17540. This prior device comprises a mirror cylinder frame supported rotatably to a bearing shaft disposed along a photographing optical axis and outside an effective optical flux of the photographing optical axis, a main lens supported slidably to a camera body so as to move toward a first setting position corresponding to a wide-angle mode and toward a second setting position corresponding to a telescopic mode along an optical axis under a guide of a bearing shaft disposed on the mirror cylinder frame, and a converter lens fixed to the mirror cylinder frame and selectively inserted in the optical axis in combination with the main lens.

Therefore, the first focal length (for example, for wide-angle) of the photographing lens unit and the second focal length (for example, for telescopic) of the photographing lens are selected in the following manner:

When setting the photographing lens unit in the wide-angle mode, the main lens system is moved backward along the photographing optical axis while the converter lens is retreated from the optical axis, thereby the wideangle lens optical system is composed only of the main lens system.

When setting the photographing lens unit in the telescopic mode, the main lens system is moved forward along the photographing optical axis and the converter lens system retreated in the wide-angle mode is inserted at the rear side of the main lens system, thereby the telescopic lens optical system is composed of both the main lens and the converter lens systems.

Heretofore, those cameras which are provided with a device to electrically drive a supporting member for supporting a photographing lens unit to both first and second setting positions include, for example, a double-focus camera in which the photographing lens unit is switched to either a long focal distance side (Telescopic side) or a short focal distance side (Wide side, and a lens-projecting camera in which the photographing lens unit is housed in the front side of the camera body while it is carried (namely, while it is not in use) and is projected from the camera body when taking a photograph.

In a case where the apparatus for driving the moving mirror cylinder is adapted to support the moving mirror cylinder as the supporting member slidably at a mirror cylinder frame fixed to the camera body and to drive the moving mirror cylinder by a motor through a link mechanism, the two driving methods are conceivable to drive the said moving mirror cylinder to the said first and second setting positions.

One of the two methods is to cut off the power supply to the motor just before the moving mirror cylinder abuts against a stopper disposed at each of the first and second setting positions mounted on the cylinder frame. In this method, however, there is a problem that the stopping positions of the mirror cylinder are not stably determined due to the influences of fluctuations in the power to drive the motor and to the friction between the mirror cylinder and the cylinder frame, because the mirror cylinder abuts against the stopper only by inertia of the motor after the power supply is cut off.

The other is to cut off a power supply to the motor only after the mirror cylinder abuts against the stopper. In the latter case, however, the mirror cylinder stops while both the mirror cylinder and the cylinder frame are subjected to elastic deformation, and when the power supply to the motor is cut off, or namely when the driving force is removed, the mirror cylinder is pushed back. Therefore, there is a problem that the stopping positions of the mirror cylinder are not stable in this case, either.

FIG. 27 is a side view showing the outlined features of the apparatus for driving the moving mirror cylinder of a camera (hereinafter called a reference example).

In FIG. 27, a cylindrical moving mirror cylinder 151 supporting movably forward and backward the photographing lens unit 150 is mounted on the camera body, the lens unit 150 comprises a plurality of lenses. A flange 152 is formed at the rear end of the cylinder 151, the flange 152 is adapted to abut against the stopper 153 disposed at the camera body.

A projecting arm 152a is disposed at the rear end of the flange 152. A pin 152b is mounted on the arm 152a at an approximate center of the arm 152a.

A driving arm 154 is disposed rotatably at a bearing shaft 160 fixed to a stationary member, and a guiding hole 154c is disposed at the top end of one arm portion 154a of the arm 154. The hole 154c is oblong along a longitudinal axis of the arm portion 154a. A driving pin 158a is inserted into the hole 154c so that the arm 154 rotates around the shaft 160, as the pin 158a rotates. The base end portions of two leaf springs 154d, 154e are fixed at the top end of the other arm portion 154b of the arm 154, the top ends of two springs 154d and 154e sandwiches the pin 152b with a predetermined gap.

On the other hand, an internal gear 157 is fixed to the camera body, a smaller-diameter planet gear 158 meshing with the gear 157 is supported rotatably at a bearing shaft 159. The shaft 159 is mounted on one end of an arm section 156 the other end of which is supported rotatably around a rotating shaft 155. The pin 158a is mounted on the gear 158 apart from the center of the gear 158. The shaft 155 is connected integrally with an electric motor and a sun gear 161 meshing with the gear 158 is fixed on the shaft 155.

In order to set the cylinder 151, for example, from the long focal distance side to the short focal distance side (as shown in FIG. 27), the rotation of the motor (not shown) is transmitted to the shaft 155. Then, the gear 161 is rotated, for example, clockwise, the gear 158 revolving clockwise around the shaft 155 and rotating on its axis counterclockwise around the shaft 159. Then, the pin 158a is displaced upwards, the arm portion 154a is pushed upwards. The arm 154 rotates counterclockwise around the shaft 160, and the pin 152b is pushed by the spring 154e, thereby the cylinder 151 moves to project from the front side of the camera body. Such movement continues until the front edge of the flange 152 of cylinder 151 abuts against the stopper 153, and as the shaft 155 rotates further, the spring 154e continues to urge the pin 152b, then power supply to the electric motor is cut off. At that condition, the line connecting the center of the pin 158a, the center of the shaft 159 and the shaft 155 is aligned to the change point of the driving mechanism.

If the cylinder 151 is pressed by an external force, the cylinder 151 moves toward the long focal distance side against the force of the spring 154e. When this external force is eliminated, the flange 152 of the cylinder 151 is returned to abut against the stopper 153.

In this embodiment, however, since the springs 154d, 154e, each having a strong spring force are used to securely retain the cylinder at a predetermined setting position, a large motor torque is required to cause the springs 154d, 154e to press the cylinder 151, thereby resulting in the need of a larger-sized motor with more power consumption. Since the springs 154d, 154e, each supported like cantilever are used to retain the cylinder 151, there is a fear that the springs 154d, 154e will exceed their elastic limit and to plastically deformed if an excessive external force is applied to the cylinder 151, thereby the function to retain the setting positions is lost.

Since it is necessary to accurately set the change point in the planet gear mechanism for the purpose of assuring the maintaining of the setting positions for the cylinder 151, all the components must be machined with high precision, not leaving any unnecessary play in them, thus leading to a problem of higher machining and assembling costs.

When turning attention to a driving unit which drives the moving mirror cylinder to either the first setting position or the second setting position, the driving unit is adapted to drive the moving mirror cylinder by an electric motor via a driving system comprising a speed reduction mechanism and other components and to position the moving mirror cylinder at the first setting position or the second setting position by cutting off the power supply to the motor at the same time or immediately before an engage portion of the moving mirror cylinder abuts against stoppers disposed at portions each corresponding to the first setting position and the second setting position respectively.

When cutting off the power supply to the motor at the same time of the abuttment of the engage portion against the stopper, however, elastic deformation of the stopper or the engaging portion and the member in the driving system may cause the moving mirror cylinder to pass through the first setting position or the second setting position, and cause to return and go over the first setting position or the second setting position due to the reaction, while no external force is applied as a result of cutting off power supply to the electric motor. In other words, the moving mirror cylinder stops at a position where it is pushed back by the reaction, thereby there is a problem that the positioning of the mirror cylinder is inaccurate. To solve it, power supply to the motor is cut off immediately before the engaging portion abuts against the stopper, by anticipating the fluctuation in the stopping position of the mirror cylinder by the elastic deformation. However, an external force (driving power) is removed immediately before the abuttment of the engage portion against the stopper, thereby the movement thereafter being determined by inertia of the mirror cylinder, the driving system, and the electric motor and resulting in a problem that the performance of the electric motor, friction between the cylinder frame and the mirror cylinder, and other elements are not uniformly constant among cameras and the stopping positions of the mirror cylinder varys due to fluctuations in the power voltage of the electric motor.

The engaging portion abuts gently against the stopper rather than colliding with it by means of a chopper control system which supplys intermittent pulse-like electric power at a certain cycle and controls the pulse widths over the whole process in which the mirror cylinder is driven from the first setting position to the second setting position However, there is a problem that the fluctuation ratio of the pulse widths cannot be uniformly determined over the whole process due to deviations of the motor performance, of friction between the cylinder frame and the mirror cylinder, and of initial location of the mirror cylinder. Conversely speaking, once the fluctuation ratio is determined, various conditions may coincide with it by chance in some cases, but the abovementioned deviations results in excessive or insufficient driving force and in an inaccurate stopping position.

Generally, a moving mirror cylinder accomodating and supporting the main lens unit therein is projects from and is to be housed to the camera body in order to change over the focal length by moving the main lens unit along the photographing optical axis. However, if dust comes in an opening between the mirror cylinder and the camera body or if an operator's (or photographer's) finger is inadvertently placed between them while the mirror cylinder is housed to the camera body from the projected condition, they will sometimes prevent the mirror cylinder from moving smoothly, thereby the mirror cylinder stopping on the way and not reaching the desired location.

Generally speaking, cameras produced in recent years adopt more electronic devices than ever, and the mirror cylinder is driven by an electric motor via a mechanical units, the position of the mirror cylinder is confirmed by means of such devices as a lens position detecting switch provided at the stop position corresponding to a predetermined focal length, and these operations are judged and controlled by a microcomputer.

If the mirror cylinder become immobile on the way to the housing position in the camera body, as described above, the microcomputer judges that the mirror cylinder does not reach the stop position because no changes are occurred in the position detecting switch, thereby the electric motor continuing to rotate. Therefore, excessive load is given to the gear system of the mechanical units, resulting sometimes in such hazards as damages in the system or injury of the operator's fingers and sometimes in a serious problem that no further photographing is possible because the mirror cylinder is not housed in the camera body. There is another defect that a large current continues to flow to the electric motor to uselessly consume the source batteries.

The power supply to the electric motor is cut off assuming that occurrence of such abnormalities is detected, if no changes are found in the position detecting switch in a predetermined time after the operation to change over the focal length (in the direction to house the mirror cylinder) is started. However, if dust or a finger is caught in an opening between the mirror cylinder and the camera body, the electric motor stops operation on the condition as it is, but in order to remove such dust or finger, the mechanical units and the motor are driven reversely. So, there is such problems as reverse driving is sometimes impossible depending on the structures of the mechanical units, and that even if it is possible, a strong external force is required for that purpose, thereby it being often seen in actuality that such dust and finger are not removed. Moreover, cameras with such a structure do nothing more than cut off the power supply to the electric motor after a predetermined time passes, and if the focal length change-over operation is started again, the electric motor is further driven in the direction to house the mirror cylinder irrespective of the fact that the mirror cylinder can not move at all.

In a variable focus optical system of the multifocus cameras, the rear surface of the lens unit is positioned near the film aperture when changing over focal lengths, if the converter lens unit is, for example, selectively inserted into the photographing optical axis. Especially in lens shutter-type cameras, it has nothing that shuts off the lens unit like a focal plane, the rearmost surface of the converter lens unit is exposed near the film aperture. On the other hand, there are general demands for more compact cameras in the markets, and in order to meet them the cameras are extremely short in back focus, namely, the distance from the apex of the rearmost surface of a photographing lens unit to the focus of an image. Since a short back focus like this causes the rearmost surface of the photographing lens unit to come immediately before the film aperture (or guide rail portion), such troubles as a photographer's finger touches the rearmost surface of the photographing lens or dust may adhere to it is not avoided, even if due care is exercised, while replacing a film or manipulating the camera by opening its rear lid. The shorter is the back focus of the photographing lens, however, the smaller is the optical flux that passes through the lens near to the film surface, and if fingerprints or dust adhere to the rearmost surface of the photographing lens, they interrupt an optical flux, often resulting in problems of uneven exposure or occurrence of flaring.

Since a photographing lens to be located near to a film is often made of plastics and is extremely soft in many cases, it is frequently damaged, if inexperienced persons attempt to wipe off the fingerprints or dust adhered as described above.

There is a possibility that a photographer's finger or foreign matter may be caught by the mechanical unit for selecting focal lengths in the conventional multi-focus cameras, thereby excessive force being applied to the mechanical unit and leading in some cases to troubles of injury or damages. Even if they are not so seriously damaged, there is a probability of degraded perforamance such as dislocation from the optical axis of the converter lens unit which requires accuracy.

SUMMARY OF THE INVENTION

The first object of this invention is to provide an apparatus for driving an moving mirror cylinder of a camera which ensures to securely drive the moving mirror cylinder to a predetermined setting position, to stably maintain the driving condition of the cylinder, and to enhance the accuracy and reliability of the setting position of the cylinder.

According to this invention, the above mentioned first object is attained by a first apparatus for driving a moving mirror cylinder or barrel of a camera, said barrel supporting a photographing lens unit and retained mechanically and slidably with a camera body between a first setting position located in a forward direction of an optical axis of said lens unit and a second setting position located in a backward direction of said optical axis, comprising;

a driving gear supported rotatably with a bearing shaft fixed to said camera body, a motor disposed at said camera body for driving said driving gear, a first connecting shaft disposed at a periphery of an end face of said driving gear, a second connecting shaft disposed at a rear end of said barrel.

a spring member connected rotatably to said first connecting shaft at one end thereof and connected rotatably to said second connecting shaft at the other end thereof, and a connecting piece beared rotatably to said first connecting shaft at one end thereof and connected rotatably to said second connecting shaft at the other end thereof, at least one of said one end and said other end being connected to said connecting shaft so as to have clearances along the both directions of said optical axis when said spring member is set in natural length.

According to the first apparatus of this invention, the moving lens barrel can be securely driven to a predetermined setting position, the driving condition of the barrel can be stably maintained, and the accuracy and reliability of the setting position of the barrel can be enhanced.

The second object of this invention is to provide an apparatus for driving a moving lens barrel of a camera which ensures to speedily and securely drive the moving lens barrel to a predetermined setting position and to stably maintain the driving condition of the cylinder.

According to this invention, the above mentioned second object is attained by a second apparatus for driving a moving len barrel of a camera by a motor, said barrel supporting a photographing lens unit and retained mechanically and slidably with a camera body between a first setting position located in a forward direction of an optical axis of said lens unit and a second setting position located in a backward direction of said optical axis, comprising;

a first stopper disposed at said first setting position for stopping a movement of said barrel towards said first setting position;

a second stopper disposed at said second setting position for stopping a movement of said barrel towards said second setting position;

a detecting means for detecting that said barrel is positioned in the vicinity of one of said first setting position and said second setting position, an intermitting means for intermitting of the power supply to said motor, and a controlling means for receiving an output of said detecting means and for controlling said intermitting means such that said power supply is intermitted at regular cycles after the timing at which said controlling means receives said output, a time period at which a power is supplied to said motor in said cycle gradually decreases according to a lapse of time from said timing, and said power supply is cut off.

According to the second apparatus of this invention, the moving lens barrel can be speedily and securely driven to a predetermined setting position and the driving condition of the barrel can be stably maintained.

The third object of this invention is to provide an apparatus for driving a moving lens barrel of a camera which ensures that, even in occurrence of abnormalities in which such obstacles as dust and an operator's finger is caught between the moving lens barrel and the camera body and the barrel is prevented from reaching the second setting position while the barrel is housed toward the second setting position, the finger or other physical parts can be protected from injury or such injury can be minimized and that the camera can immediately get rid of the abnormalities to return to a normal state.

According to this invention, the above mentioned third object is attained by a third apparatus for driving a moving lens barrel of a camera by a motor, said barrel supporting a photographing lens unit and retained mechanically and slidably with a camera body between a first setting position located in a forward direction of an optical of said lens unit and a second setting position located in a backward direction of said optical axis, comprising;

a selecting means for outputting an order to switch selectively a position of said barrel between said first setting position and said second setting position, a judging means for receiving said order, for outputting a driving information relating to whether said order belongs to said driving direction toward said first setting position or said driving direction toward said second setting position, a detecting means for detecting that said barrel is positioned at one of said first setting position and said second setting position, a first controlling means for controlling said motor such that said barrel is driven to one of said first setting position and said second setting position, a timing means for timing a predetermined switching time from the timing at which said barrel starts to be driven to said barrel second setting position by said first controlling means, based on a direction information for driving said barrel toward said second setting position, and a second controlling means for controlling said barrel first controlling means such that said barrel is returned to said barrel first setting position when discriminating that said barrel does not reach to said second setting position at the time at which said switching time is received from said barrel timing means.

According to the third apparatus of this invention, even in occurrence of abnormalities in which such obstacles as dust and an operator's finger is caught between the moving lens barrel and the camera body and the barrel, is prevented from reaching the second setting position while the barrel is housed toward the second setting position, the finger or other physical parts can be protected from injury or such injury can be minimized and that the camera can immediately get rid of the abnormalities to return to a normal state.

The fourth object of this invention is to provide an apparatus for driving a moving mirror cylinder of a camera which ensures to speedily and securely drive the moving lens barrel to a predetermined setting position and to stably maintain the driving condition of the cylinder.

According to this invention, the above mentioned fourth object is attained by a fourth apparatus for driving a moving lens barrel of a camera by a motor, said barrel supporting a photographing lens unit and retained mechanically and slidably with a camera body between a first setting position located in a forward direction of an optical axis of said barrel lens unit and a second setting position located in a backward direction of said optical axis, comprising;

a first stopper disposed at said first setting position for stopping a movement of said barrel towards said first setting position;

a second stopper disposed at said second setting position for stopping a movement of said barrel towards said second setting position;

a detecting means for detecting that said barrel is positioned in the vicinity of one of said first setting position and said second setting position, an intermitting means for intermitting of the power supply to said motor, and a controlling means for receiving an output of said detecting means and for controlling said intermitting means such that said power supply is intermitted after the timing at which said barrel controlling means receives said output, a time period at which a power is supplied to said motor in a predetermined unit time decreases to a predetermined length after a predetermined lapse of said barrel unit time from said barrel timing, and said barrel power supply is cut off.

According to the fourth apparatus of this invention, the moving lens barrel can be speedily and securely driven to a predetermined setting position and the driving condition of the barrel can be stably maintained.

BRIEF DESCRIPTION OF THE DRAWINGS

FIG. 13 is a flow chart showing the operation sequence of the circuit 30 of FIG. 7.

FIG. 14 is a block diagram showing one embodiment of the third apparatus according to this invention.

FIG. 19 is a flow chart showing the operation sequence of the apparatus of FIG. 18.

DETAILED DESCRIPTION OF THE PREFERRED

Explanation will now be made to preferred embodiments of this invention referring to the accompanying drawings.

The embodiments to be described below are only means for providing a clear understanding of this invention. Various changes and modifications could be made by those skilled in the art without departing from the invention clearly defined in the attached claims.

Figure 1:
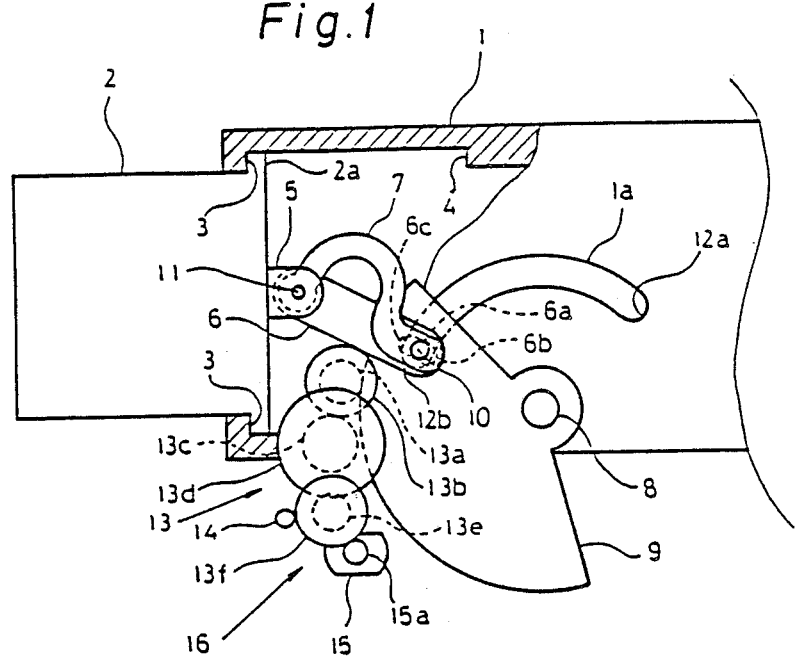
FIG. 1 is an elevation view of one embodiment of the first according to this invention, viewed from the direction marked A in FIG. 2.
Figure 2:
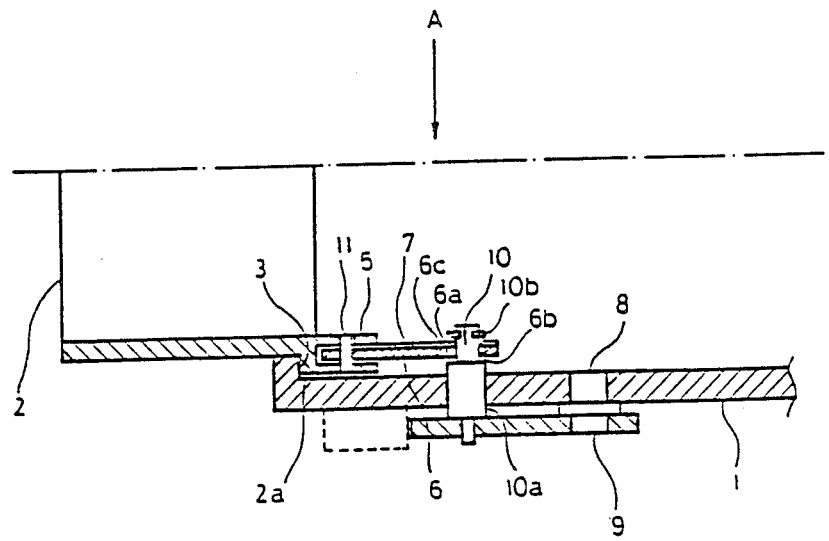
FIG. 2 is a partial transverse cross section of FIG. 1.

FIGS. 1 and 2 show one embodiment of the moving mirror cylinder of a camera of this invention.

In FIGS. 1 and 2, an oblong, arc-like slit 1a is disposed on both sides of a mirror cylindrical frame 1 fixed to the camera body (not shown). A moving lens barrel, also referred to as a mirror; cylinder 2, supporting the photographing lens unit and other related components is housed slidably to the frame 1. At the inner circumferential portion of the fore end of the frame 1 is provided a T side stopper 3 comprising a stepped surface for positioning the cylinder 2 at a telescopic side position T as the first setting position by allowing the flange 2a disposed at the rear end of the cylinder 2 to abut against the stopper 3 while at the inner circumferential portion of the internal predetermined portion of the frame 1 is provided a W side stopper 4 comprising a stepped surface for positioning the cylinder 2 at a wide-angle side position W as the second setting position by allowing the flange 2a to abut against the stopper 4. A fork-shaped engaging piece 5 is extended from both side portion of the cylinder 2 to the inside of the frame 1 in the longitudinal direction of the frame 1. An oblong hole 6a is disposed at the rear end portion of an intermediate lever 6 as a plate-like connecting piece having a large rigidity. 6b and 6c indicate the rear end and fore end of the hole 6a, respectively. A leaf spring 7 is superposed on the lever 6. The spring 7 as an elastic member is bent partly, projecting into a side. A bearing shaft 8 disposed on the frame 1 supports rotatably a fan-shaped gear 9 as a driving gear. The first connecting shaft 10 is fixed to the periphery of the gear 9 and is loosely put into the hole 6a of the lever 6 the spring 7 and engages with the shaft 10 at one end thereof. A large-diameter portion 10a is formed concentrically at a middle portion of the shaft 10. The portion 10a is inserted into the hole 1a. A snap ring 10b (not shown in FIG. 1) is put in the top end of the shaft 10. The second connecting shaft 11 is supported with the piece 5 and connects rotatably the other end of the lever 6 and the other end of the spring 7 to the piece 5. The rear part of the hole 1a is long enough such that the portion 10a does not abut against the rear end 12a even when the flange 2a abut against the stopper 4. The fore part of the hole 1a is long enough such that the portion 10a does not abut against the fore end 12b even when the flange 2a abut stopper 3. A motor 15 is connected to the gear 9 via the speed reduction mechanism 13. The mechanism 13 comprises a small-diameter gear 13a meshing with the gear 9, a large-diameter gear 13b integral with the gear 13a, small-diameter gears 13c and 13e and large-diameter gears 13d and 13f of the same relationship. The motor 15 is adapted to act as an electromagnetic brake as soon as power supply to it is cut off. A driving gear 15a meshing with the gear 13f is fixed onto a driving shaft of the motor 15. In this figure, 16 indicates a driving system comprising the mechanism 13 (the gears 13a to 13f), the motor 15, and the gear 15a. The piece 5 to the mechanism 13 as well as the hole 1a are disposed in pairs on both sides of the cylinder 2 and the frame 1, and the connecting gear 14 is adapted to transmit the power to the mechanism 13 on the opposite side which is not shown.

The shaft 8 and the shafts 10 and 11 are adapted to be aligned approximately on a straight line, namely, positioned on a change point, when the flange 2a abuts against the stopper 3.

The length from the rear end 6b to the fore end 6c of the hole 6a is set to that which is sufficient to absorb elastic deformation of each component of the power transmission system from the driving system 16 to the cylinder 2 and the frame 1.

Figure 3:
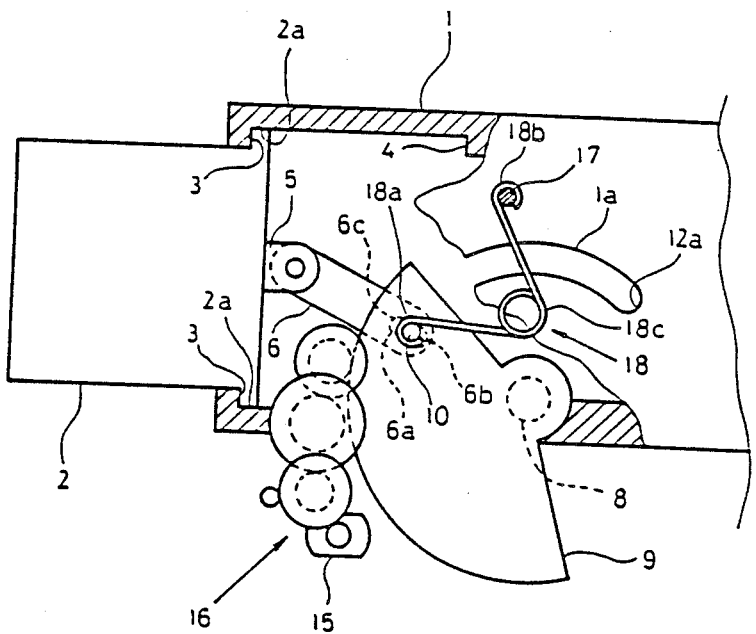
FIG. 3 is an elevation view of another embodiment of the first apparatus according to this invention, showing the state of the first setting position of the moving mirror cylinder.
Figure 4:
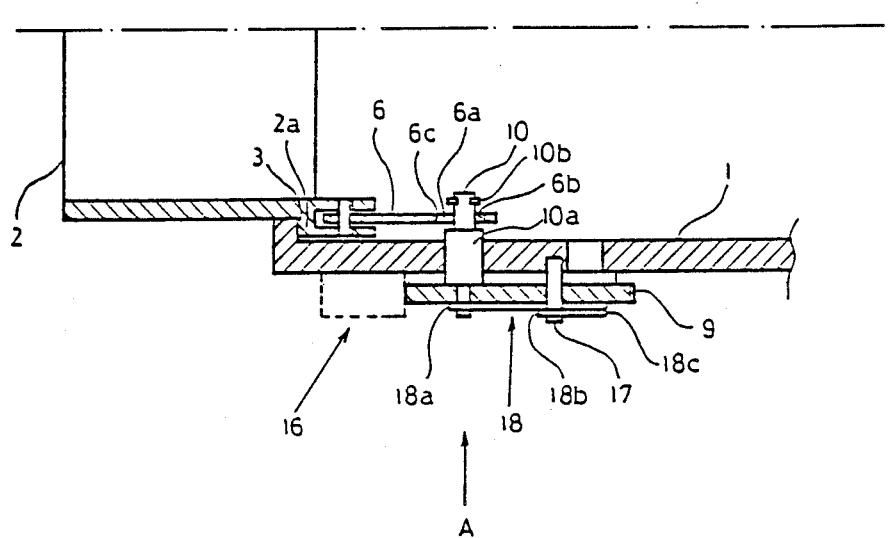
Fig. 4 is a partial transverse cross section of FIG. 3.
Figure 5:
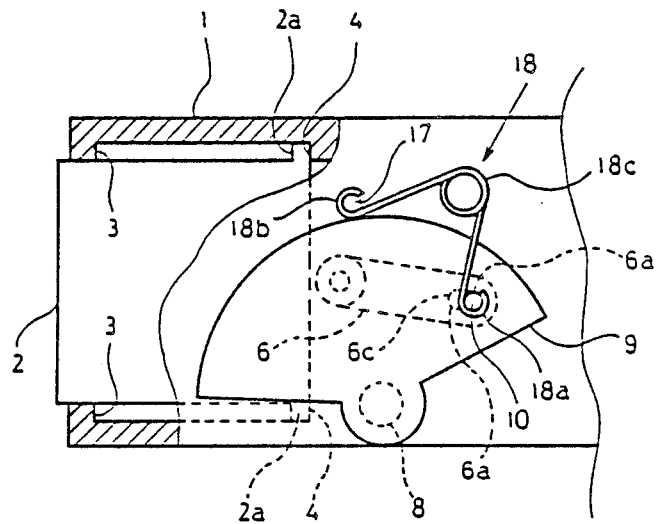
FIG. 5 is an elevation view of another embodiment, showing the state of the setting position of the moving mirror cylinder.
Figure 6:
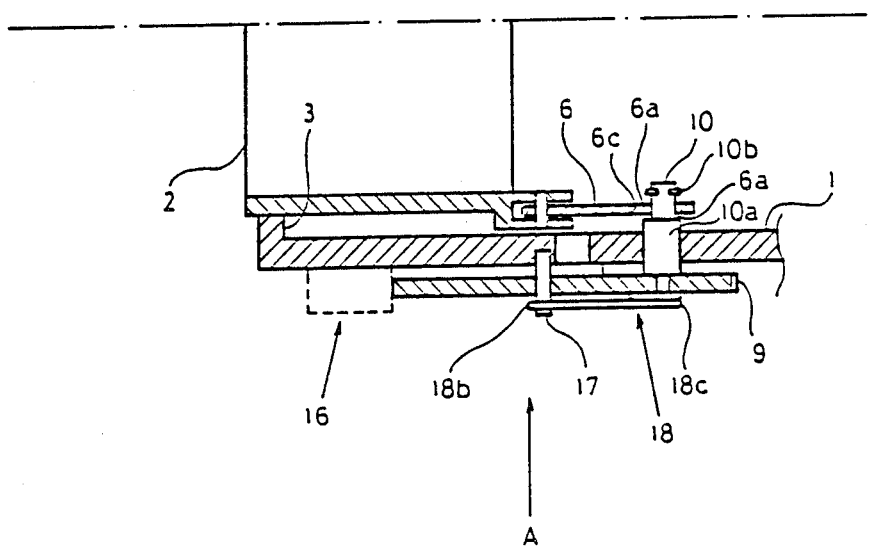
FIG. 6 is a partial transverse cross section of FIG. 5.

FIGS. 3 through 6 show another embodiment of the first apparatus of this invention. FIGS. 3 and 4 show the states in which the mirror cylinder 2 is positioned at the position T while FIGS. 5 and 6 show those in which it is positioned at the position W.

Since the apparatuses of FIGS. 3 through 6 are generally constructed in a similar manner as FIGS. 1 and 2, and the same numbers are given to the same components as those of FIGS. 1 and 2 and their descriptions are omitted here.

The torsion bar 18 comprises a wire made of an elastic material being turned once or twice at the middle thereof and both ends of the wire are formed in an approximately U shape. The boss 17 for engaging with the spring 18 is fixed to the frame 1. Approximately circular engaging portions 18a and 18b are formed at both ends of the spring 18 and a torsion portion 18c formed in a coil is prepared at the center of spring 18. One engaging portion 18a supported rotatably with the shaft 10 and the other engaging portion 18b is supported rotatably with boss 17. The other embodiment is composed of a wire-type torsion spring 18 instead of the leaf spring 7 in one embodiment with the different spring urging direction.

A snap ring 10b is omitted in FIGS. 3 and 5, the driving system 16 and the hole 1a are omitted in FIG. 5. In FIG. 3, the fore end 12b of the hole 1a is not drawn since it is included within the break line, but it is same as shown in FIG. 1.

The operation in one embodiment of the first apparatus is described by referring to FIGS. 1 and 2.

The description begins with the driving and setting operations from the position W to the position T (as shown in FIG. 1). When power is supplied to the motor 15, the rotating force of the gear 15a is transmitted to the gear 9 through the mechanism 13, or through the gears 13f→13e→13d→13c→13b→13a, and the gear 9 starts rotating counterclockwise around at the shaft 8. As a result, the shaft 10 moves in the hole 6a until it reaches the balancing position slightly before it abuts against the fore end 6c, as the spring 7 is bent, and after this balancing position is attained, the shaft 10 moves forward the cylinder 2 (in the leftward direction in FIG. 1) via the lever 6 while the spring 7 is kept bent as stated above. As the gear 9 is rotated further counterclockwise, the cylinder 2 is further moved forward, and when the flange 2a abuts against the stopper 3, the limit switch (not shown) and other components cut off power supply to the motor 15. At this moment, the shaft 10 moves from the balancing position to or near a point contacting the fore end 6c. Therefore, the rotation of the gear 9 to be caused by the inertia which may occur when cutting off power supply to the motor 15 is absorbed (alleviated) by the spring 7 within the range of the hole 6a, preventing the flange 2a, the stopper 3, and the lever 6 from excessive load and allowing the cylinder 2 to be driven accurately to the position T. When the movement caused by the inertia ceases, or when the driving power disappears, each member of the power transmission system including the frame 1 and the cylinder 2 is returned to the initial state from that of the elastic deformation which the driving power causes in it, but this reforming force deforms each member in the opposite direction. In other words, elastic deformation in the position T direction is replaced with displacement in the position W direction, when taking an example of the flange 2a and the stopper 3. As a result, the cylinder 2 is pushed back in the position W direction, thereby some errors being caused in the setting position. In one embodiment of the first apparatus, however, this displacement to be caused by the movement of pushing back is absorbed by the movement of the shaft 10 within the range of the hole 6a since the spring 7 which now possesses the urging force presses the shafts 11 and 10 in the direction to separate them from each other, thereby the cylinder 2 not being pushed in the position W direction and no errors occurring in the setting position. Since the motor 15 acts as an electromagnetic brake when power supply is cut off, load upon the gear 9, the driving system 16, and so on is extremely larger than the pressing force of the spring 7, thereby the gear 9 not being reversely moved by the pressing force. Moreover, the setting position is more stably maintained in the position T side, especially because the shaft 10 is located on or near the change point on a line connecting between the shaft 11 and the shaft 8.

Now, description is to be made as to the driving and setting operation from the position T (as shown in FIG. 1) to the position W. Since the concept is similar to the driving and setting operation to the position T, the description refers simply to those portions which are different from the operation.

When the gear 9 is rotated counterclockwise by the driving system 16, the shaft 10 moves towards the rear end 6b within the hole 6a while bending the spring 7, reaches a balancing point against the elastic force of the spring 7, and maintains this state to move the cylinder 2 in the position W direction. As the gear 9 rotates clockwise and the flange unit 2a abuts against the stopper 4, power supply to the motor 15 is cut off, thereby the cylinder 2 stopping at the position W while the gear 9 continues rotating by inertia. At this moment, the shaft 10 in the hole 6a is in contact with or near the rear end 6b. Since the flange 2a or the cylinder 2 is pushed to the stopper 4 via the spring 7 and/or the lever 6, the cylinder 2 is accurately driven to the position W and is stably kept at the setting position in the same manner as described above.

The reason why the shaft 10 is designed to be located on or near the change point only in the position T is that, in the double-focus camera, for example, the accuracy of the setting position substantially affects photographing results since the focal depth is less deep in the position T side which forms a longer focal length lens system and that the position T corresponds to the photographing position of the photographing lens unit in the barrel lens-projecting camera.

Now, the other embodiment of the first apparatus is described by using FIGS. 3 through 6, and since the operation is almost similar to that in one embodiment, only those portions which differ from it are described below.

The description begins with the driving and setting operation from the positions W to T, or from the state shown in FIGS. 5 and 6 to that shown in FIGS. 3 and 4. When the gear 9 is rotated counterclockwise, the shaft 10 in the hole 6a abuts against the front end 6c of the hole 6a, and the cylinder 2 is projected until the flange 2a abuts against the stopper 3 via the lever 6 in this state. On the other hand, the spring 18 which is composed of a U-shaped spring material is rotated clockwise around the boss 17 in accordance with the rotation of the gear 9. When power supply to the motor 15 is cut off at the location where the flange 2a abuts against the stopper 3, the driving force from the driving system 16 disappears but inertia causes the gear 9 to rotate slightly more before it stops rotation completely. Then, the righting force from the elastic deformation seen in the cylinder 2, frame 1, and driving system attempts to push the cylinder 2 back to the position W side, but the elasticity of the spring 18 pushes the shaft 10 in the direction to rotate the gear 9 counterclockwise and a component of the force pushes the cylinder 2 to the position T side via the lever 6, thereby preventing the setting position from errors which may otherwise be caused by the reaction.

The driving and setting operation from the positions T to W is that which is reverse to the said operation, and it is omitted here since it may be analogized from the said operation. When describing the results alone, the elasticity of the spring 18 in the state as shown in FIG. 5 pushes the shaft 10 in the direction to rotate the gear 9 clockwise. As a result, the flange 2a is pushed to the stopper 4 via the lever 6, thereby the cylinder 2 being driven accurately onto the position W ans stably maintained at that position.

Since the power supply to the motor 15 is cut off only when the cylinder 2 reaches the positions T and W as stated above in another embodiment of the first apparatus, there are no influences from fluctuations in power voltage of the motor 15 and from friction between the cylinder 2 and the frame 1, the cylinder 2 is accurately driven to the positions T and W, respectively, and both the springs 7 and 18 prevent errors caused by reaction of elastic deformation from occurring in the setting positions, thereby enhancing the position setting accuracy as well as the reliability of the setting operation. Additionally, there is no need of high-precision finish which does not allow rough machining as to, for example, the gear 9, the lever 6, and the piece 5 as is the case with conventional techniques. Since the rough machining is rather utilized in this invention, there are merits of reducing machining and assembling costs.

For example, the spring 7 is not limited to a plate one and may be replaced with the spring 18.

The present invention is applicable to both the double-focus and the lens-projecting cameras.

Figure 7:
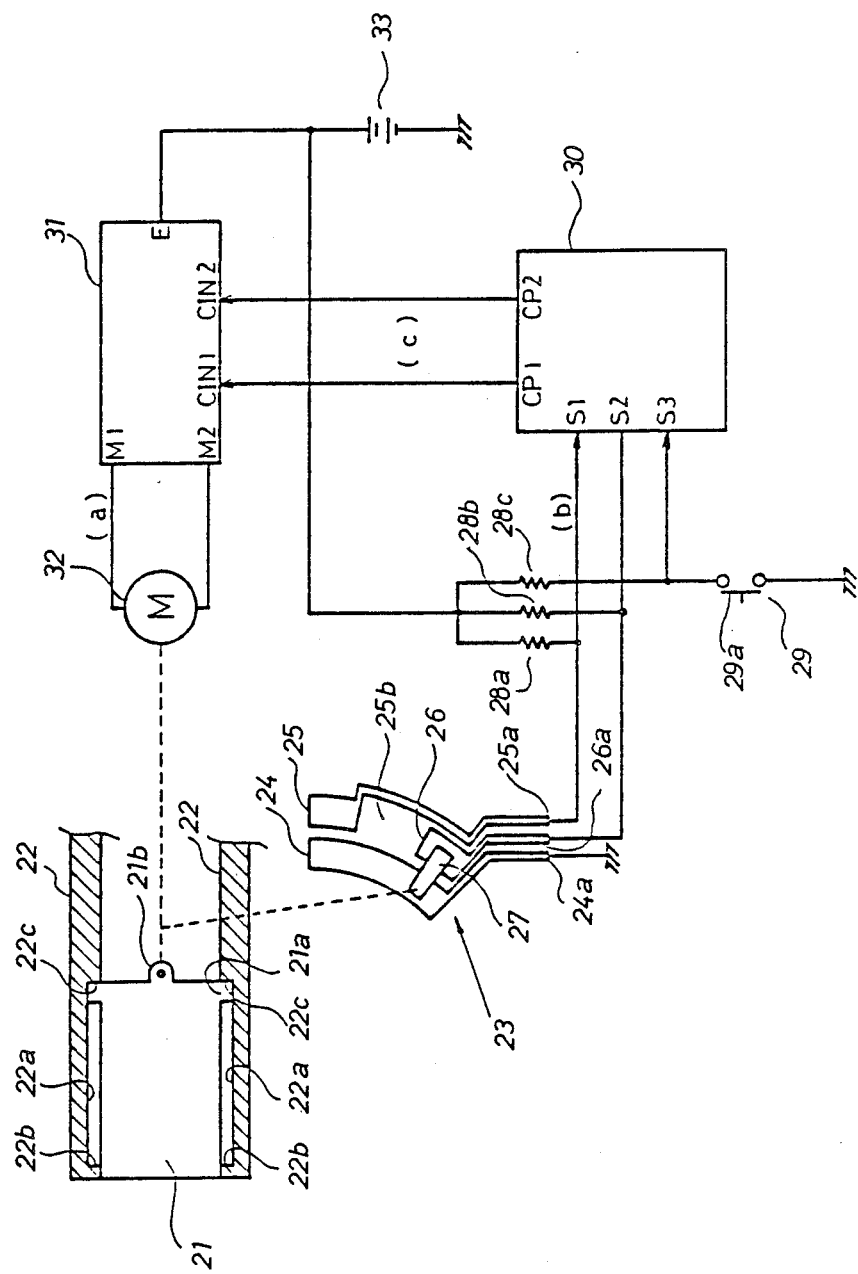
FIG. 7 block diagram showing one embodiment of the second to this invention.

In FIG. 7, a flange 21 a is provided as a engaging portion at the rear end of the moving mirror cylinder 21 for holding the main lens system, and an arm 21b projects in the direction of the optical axis at the rear end of the cylinder 21. A sliding surface 22a on which the flange 21a is slided is disposed on the inner circumferential of the frame 22 supporting the cylinder slidably. A telescopic side stopper 22b comprising a stepped surface is disposed at a telescopic side position T as the first setting position in the inner circumference of the fore end of the frame 22. A wide-angle side stopper 22c comprising a stepped surface is disposed at a wide-angle side position W as the second setting position in the inner circumference of the rear edge of the frame 22. The position detecting circuit 23 comprises electrodes 24, 25 and 26 deposited on a so-called flexible printed circuit board (hereinafter abbreviated as "PCB") and a short-circuiting piece 27 supported slidably on the electrodes from 24 to 26 for short-circuiting the electrodes 24 and 26, or 24 and 25. The electrodes 24, 25 and 26 are insulated from each other by means of an insulator 25b. In a control circuit 30 comprising, for example 4-bit CPU and other components, S1, S2, and S3 represent input terminals while CP1 and CP2 represent output terminals for outputting control signals. In a switching circuit 31 comprising power transistors, CIN1 and CIN2 represent control input terminals connected to the terminals CP1 and CP2, respectively, of the circuit 30, E represents a power input terminal, M1 and M2 represent driving output terminals, 32 represents an electric motor, 33 represents a power source comprising a lithium battery, and (a), (b) and (c) represent a driving signal, a position signal, and the control signal, respectively.

The output terminal 24a of the electrode 24 is grounded, and the respective output terminals 25a and 26a of the electrodes 25 and 26 are connected in parallel with terminals of the pull-up resistances 28a and 28b and the terminals S1 and S2 of the circuit 30 respectively, while the other terminals of the resistances 28a and 28b are connected with the positive pole of the power source 33. The T/W selecting switch 29 is grounded at one end thereof and connected in parallel with one end of the resistance 28c and the terminal S3 of the circuit 30 at the other end thereof, and the other end of the resistance 28c is connected to the positive pole of the power source 33. The negative pole of the power source 33 is grounded and the positive one is connected to the input terminal E of the circuit 31. The output terminals M1 and M2 are connected to the electric motor 32. The circuit 31 controls the intermittence of power and direction of current to be applied to the terminal E in accordance with the signal (c) which is input to the terminals CIN1 and CIN2, while the intermittent supply of power is adapted to be applied to the motor 32 as signal (a).

When driving the cylinder 21 from the position W to the position T, the terminal CP1 outputs signals (c), for example, to give forward rotation to the motor 32. When driving the cylinder 21 from the position T to the position W, on the other hand, the terminal CP2 outputs signals (c), for example, to give reverse rotation to the motor 32. Usually H-level signals are applied to the terminal S3 of the circuit 30 since the positive voltage of the power source 13 is applied to the terminal S3 through the resistance 28c. When the push button 29a of the switch 29 is pressed, the switch 29 is closed to make the signals to the terminal S3 into L level which is given to the circuit 30 for starting it. The signals (b) applied to the terminals S1 and S2 is of L level if the piece 27 bridges the electrodes 24 and 26 and the electrodes 24 and 25, respectively, while the signals (b) are of H level if the piece 27 is located upon the electrode 24 and the insulator 25b.

Each of the signals (b) is adapted to be switched into L level just before the flange 21a abuts against the stoppers 22b and 22c, respectively.

Figure 8:
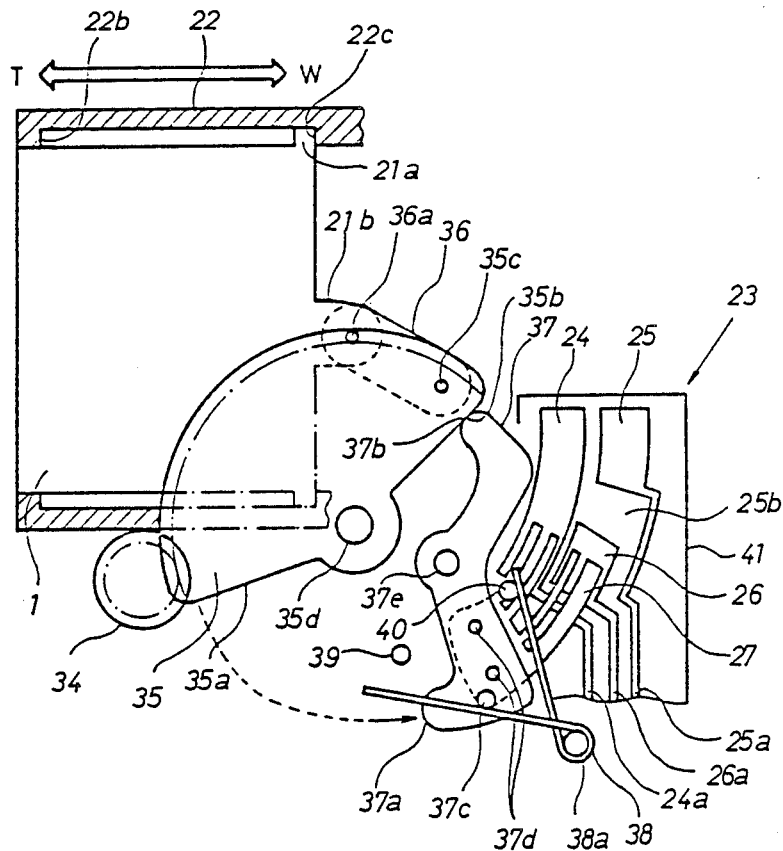
FIG. 8 is an elevation view of the one embodiment of the second apparatus according to this invention.

FIG. 8 is an elevation view of one embodiment of the second apparatus, with the cylinder 21 set at the position W. In FIG 8, those components which are same or equivalent to those in FIG. 7 are shown with the same symbols as those used in FIG. 7, and similar descriptions are omitted here.

A fan-shaped gear 35 is meshed with the driving gear 34 fixed to the driving shaft of the electric motor 32. A connecting pin 35c is disposed on the periphery of the gear 35 and the gear 35 is supported rotatably with the shaft 35d fixed onto a fixed part of the camera body. The gear 35 and the arm 21b are connected with each other by means of an intermediate lever 36. The lever 36 is fitted into the pin 35c at one end side hole thereof and fitted at the other end side thereof into a connecting pin 35a fixed the arm 21b. Abutting portions 37a and 37b are projected at both ends of the bell crank-shaped T/W switching lever 37 in the direction toward the portion 35a and 35b *of the gear 35, respectively. A connecting pin 37c* is fixed at the lower end of the lever 37. Fixing pin 37d for fixing the piece 27 which bridges the electrodes 24 and 26, or the electrodes 24 and 25, respectively, at the lower arm of the lever 37. The lever 37 is supported rotatably with a shaft 37e fixed onto the fixed part of the camera body. The torsion spring 38 urged in the direction in which both linear portions draw near (in the direction in which the opening angle is reduced) is supported by a shaft 38a is fixed onto the fixed part of the camera body. Stopping pins 39 and 40 are disposed on the fixed part of the camera body, and each is adapted to abut against the inner side of the linear portion of the spring 38. 41 which is omitted in FIG. 7 shows a PCB fixed onto the fixed part. Since the pins 39 and 40 are disposed on the wall surface of the member which is located at a forward part in the drawing, they are out of the rotating ranges of the lever 37 and the piece 27.

Figure 9:
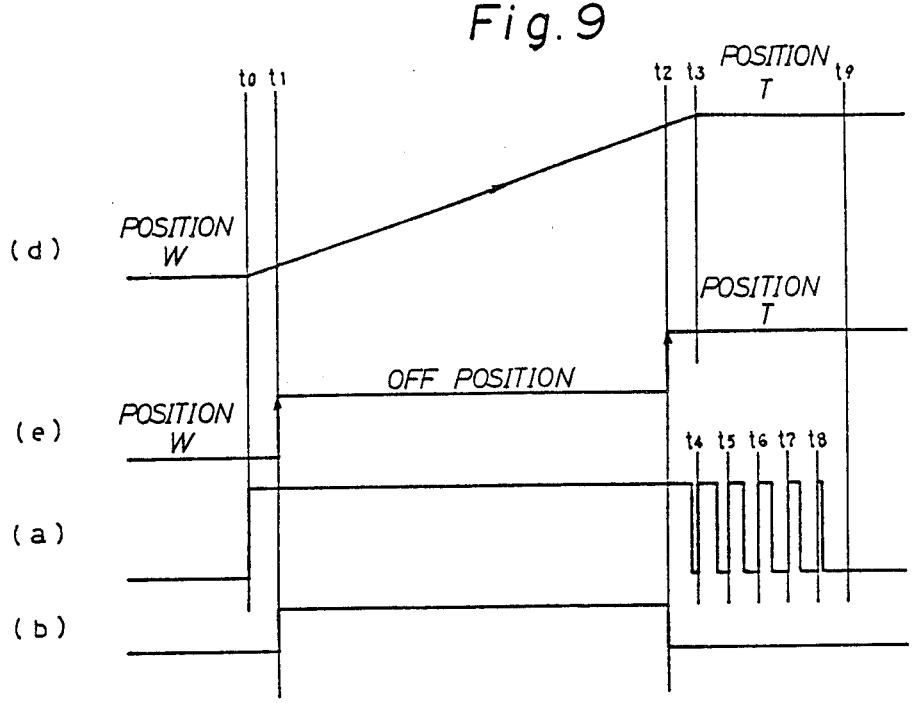
FIG. 9 is a timing chart in a case where the moving mirror cylinder of FIG. 8 moves from a position W to a position T.
Figure 10:
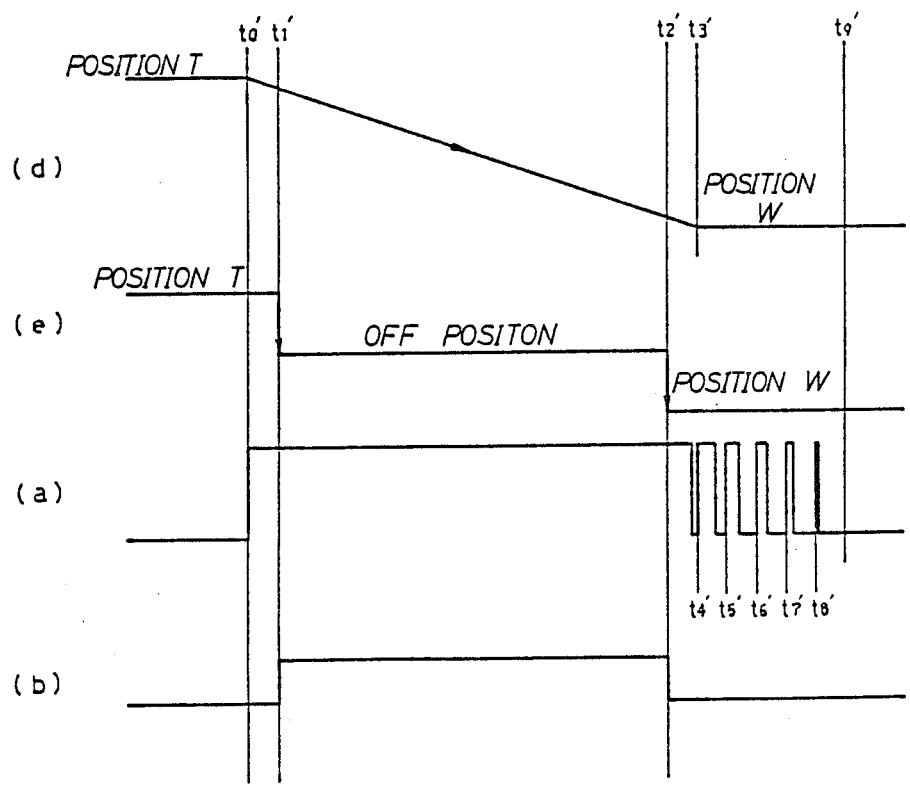
FIG. 10 is a timing chart in a case where the moving mirror cylinder of FIG. 8 moves from a position T to a position W.

FIGS. 9 and 10 are timing charts showing operating waveforms of each component in FIG. 7 and displacement of each member in FIG. 8, with the movement from the position W to the position T shown in FIG. 9 and that from the position T to the position W in FIG. 10.

In FIG. 9 (d) represent a waveform showing displacement in the barrel 21, and (e) represents a waveform showing displacement in the piece 27, with the "OFF position" showing that the piece 27 is located upon the insulator 25b of the PCB. Signals (a) and (b) represent a driving signal t the motor 32 of FIG. 7 and the position signal of the barrel 21 to the circuit 30 of FIG. 7, respectively.

The t0 shows the timing at which the switch 29 is closed; t1 shows the timing at which the piece 27 reaches the "OFF position"; t2 shows the timing at which the piece 27 departs from the "OFF position"; t3 shows the timing at which the flange 2la of the cylinder 21 abuts against the stopper 22b; t9 shows the timing at which power supply to the motor 32 is cut off. t4 to t8 show the timings at which the signals (a) are turned on by a cycle T0 described below.

In FIG. 10, t3′ shows the timing at which the flange 21a r21a of the cylinder 21 abuts against the stopper 22c; t0′ to t9′ are same as t0 to t9 in FIG. 9; and (d),(e),(a) and (b) represent the same as in FIG. 9.

Figure 11:
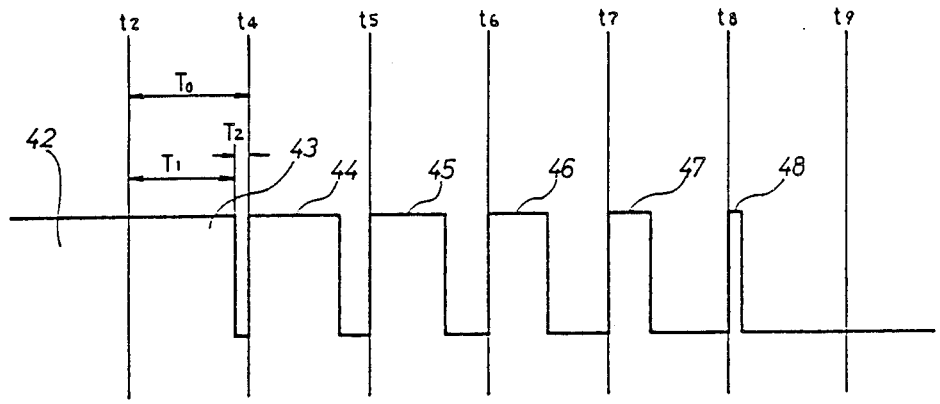
FIG. 11 is a partially enlarged timing chart showing a driving signal (a) of FIG. 10.

FIG. 11 shows a waveform of the signal (a) at the timings from t2 to t9. In the figure, 42 represents a non-controlled section; 43 to 48 represents the first to the sixth pulses, respectively; T0 represents a cycle of intermittent control; T1 represents ON time; and T2 represents OFF time.

Figure 12:
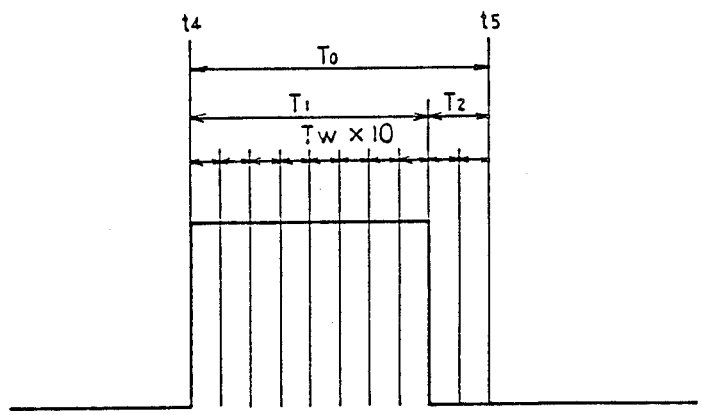
Fig. 12 is a partially enlarged timing chart of FIG. 11.

FIG. 12 shows a waveform of the signal (a) at the timings from t4 to t5 in FIG. 11. In the figure, Tw x 10 shows a time interval of the cycle t0 divided into ten equal portions, and Tw shows the basic time.

FIG. 13 is a flow chart showing the operation sequence of the circuit 30. Prior to giving detailed description of this figure to be made in the description of operation below, description is made here to several symbols used. The followings are constituted with software, and PC represents pulse counter; T0 represents T0 counter; T0′ represents T0′ counter; T1 represents T1 counter; T1′ represents T1′ counter; T2 represents T2 counter; T2′ represents T2′ counter; and Tw represents Tw timer.

The operation of the embodiment composed as stated above is now described mainly by using the flow chart shown in FIG. 13. The description begins with the operation from the position W to the position T. The control of circuit 30 commences operation from the "START" in the flow chart when the switch 29 is closed, and the driving direction of the motor 32 at the process of "S1='H' ?" is determined. If S1=H, in other words, it is determined that the cylinder 21 is located at the position W, the flow branches in the direction of YES, signals (c) is output from the terminal CP1 at the timing t0 so that the cylinder 21 is driven from the position W to the position T, and the circuit 31 is controlled at the process of the "motor forward rotation ON." The circuit 31 connects the terminal E to the terminals Ml and M2 to connect power source 33 to the motor 32 so that the motor 32 rotate forward. The gear 35 is rotated counterclockwise by means of the gear 34, and the cylinder 21 is driven by means of the lever 36 to start moving from the position W (as shown in FIG. 8) to the position T. On the other hand, the pulse counter is set to a predetermined value (PC =6 in this embodiment) at the process of "PC setting," and T0 counter and T0′ counter are set to predetermined values (T0 =T0′=10 in this embodiment) at the process of "T0 and T0′ setting," then proceeding to the subsequent one. In the branching process of "S1='L'? ", NO is selected and this operation is repeated, since the piece 27 does not yet bridge the electrodes 24 and 25. On the other hand, the gear 15 continues counterclockwise rotation, and the lever 37 is urged to rotate counterclockwise via the pin 37c due to the coiling performance of the spring 38, thereby the lever 37 continuing rotation to follow the rotation of the gear 35 with the abutting face 37b and 35b being contacted with each other. As a result, the piece 7 slides in the upper right direction in FIG. 8 along the electrode 26, then departs from the electrode 26 and reaches the insulator 25b. At this timing of t1, the flow still continues branching into NO at the process of "S1='L'?". While the gear 15 further continues counterclockwise rotation, the lower linear portion of the spring 38 as shown in FIG. 8 abuts against the pin 39 due to the rotational displacement of the lever 37 in the counterclockwise direction and it goes beyond the urging zone of the lever 37, thereby the lever 37 stopping rotation. As a result, the piece 27 stops sliding in front of the electrode 25 along the insulator 25b. On the other hand, the gear 15 further continues rotation and the abutting face 37b and 35b are departed from each other to continue counterclockwise rotation until the abutting face 35a of the gear 15 abuts and presses against the abutting face 37a of the lever 37 opposite to the face 35a. As a result, the piece 27 which stops in front of the electrode 25 resumes sliding in the said direction and finally reaches the electrode 25, departing from the insulator 25b, thereby bridging the electrodes 25 and 24. At this timing of t3, "YES" is selected at the process of "S1='L'?". The T1 counter and the T2 counter are reset (T1=T2=0) in the subsequent process of "T1 and T2" resetting,", then proceeding to the following process of "T0−1 =T1′" where one is subtracted from the value in the T0 counter to set the difference to the T1′ counter. In the next process of "T0′−T1′=T2′," the value in the T1′ counter is subtracted from the T0′counter, and the balance is set in the T2′counter, or, T2′=10−9=1.

These two subtracting operations calculate both ON time T1 and OFF time T2 for the cycle T0 of the first pulse 43 as shown in FIG. 11. Then, the flow enters the process of "motor forward rotation ON". As stated above, the power is already supplied to the motor 32 in the direction that the motor 32 rotates forward, thereby power supply being substantially continued from the non-control section 42 as to the first pulse 43 only. In the next process of "Wait for Tw", operation is suspended for the basic time of Tw by referring to the Tw timer and in the next process of "T1+1", one is added to the T1 counter (namely, T1 =1). In the branching process of "T1 =T1'?"checking is effected as to whether or not the ON time previously selected passes, and if the time does not pass, NO is selected to repeat this loop of operation until the time passes. When T1=T1'=9, YES is selected and the power supply to the motor 32 is cut off in the process of "Turn off motor". After operation is suspended for the basic time of Tw as above, the value of the T2 counter is increased in the process of "T2+1" and then in the process of "T2=T2'?" checking is made as to whether or not the OFF time T2 passes. When T2=T2'=1, YES is selected, and in the process of "PC−1 =PC", the value in the pulse counter is decreased to PC =6−1=5, thereby the controlling of the first pulse 43 being completed. In the next process of "PC=0 ?" checking is made as to whether or not the whole processes is completed, and if there remain some pulses which must be controlled, NO is selected to return to the process of "Reset T1, T2". Then, controlling is started for the second pulse 44. The second pulse 44 is started by setting T1=T2 =0 in the process of "Reset T1, T2"; setting 9−1=8 =T1' with the ON time =T1 in the process of "T0−1=T1'"; setting T2'=2 with the OFF time =T2 in the process of "T0'−T1' =T2'"; and turning on the motor for forward rotation at the timing t4. By controlling the ON time T1 and OFF time T2 in the same manner as stated above, the controlling of the second pulse 44 is completed; and by controlling the second to sixth pulses to be output at the timings t4 to t9 as shown in FIG. 11 in a manner to gradually reduce their respective ON times, the controlling of the final sixth pulse 48 is completed; and finally by selecting YES in the process "PC=0 ?" in the timing t9, all the operations to move from the position W to the position T are completed. Although the description is out of sequence, the flange 21a of the cylinder 21 abuts against the stopper 22b at the timing t3 which is almost similar to the timing t2 at which the second pulse 44 starts. Although this timing of t3 is not uniformly fixed as stated in the description of the prior art, it is assumed in this embodiment for the sake of description that the timing 53 is almost similar to the timing t4 as stated above.

Therefore, since the intermittent control of power supply to the motor 32 is started from the timing t2 just before the cylinder 21 abuts against the stopper 22b, it contacts the stopper 22b while the acceleration to drive the cylinder 21 is reduced little by little by the OFF time T2 of the first pulse 43, and then the reaction of contacting with the stopper 22b moves elastic deformation of the driving system including the cylinder 21, the frame 22, the motor 32, and the lever 36 in the opposite direction, or towards the stopper 22c, thereby resulting in the movement to push back the cylinder 21 from the position T at which the cylinder 1 should stop to the position W, as stated in the description of the prior art. Since it is further driven by the driving force of the motor 32 which is gradually reduced thereafter through the second pulse 44 to the sixth pulse 48, the elastic deformation repeats displacement several times laterally in FIGS. 7 and 8, centered at the position T, with the amplitude being damped, finally standing still at the position T. Namely, the damping oscillation in the horizontal (or lateral) direction centered at the position T converges at the position T which is the central axis of the oscillation.

When referring to the moving operation from the position T to the position W, this operation is that which is reverse to the said operation rom the position W to the position T, thereby being similar to the said operation with the exception that NO is selected in the process of "S1='H'" after starting from the START point in FIG. 13 and the relationship reverse to the description above is found in the processes "motor reverse rotation" and "S2='L'?, " and so the description is omitted because it is easily analogized from the timing chart in FIG. 10 and other data.

The said embodiment is designed to continuously control the power supply to the electric motor 32 at every interval of T0 so that the ON time may be gradually shortened just before the cylinder 21 abuts against the stopper 22b or 22c, thereby being free from excessive driving or insufficient driving as seen in the prior art, to assure that the cylinder 21 is accurately positioned and is also designed to continuously control the power supply to the motor 32 after such contacting so that the movement of elastic deformation in the cylinder 21, the frame 22, and the driving system which may occur as a result of such contacting is rendered into a damping oscillation and is stopped at the position T or the position W, as the center of the movement, thereby no displacement in the stopping position being caused by reaction after the contacting.

Since the timing t3 at which the cylinder 21 abuts against either of the positions is included in the controlled timings from t2 to t3, the movement is free from influences of various deviations such as deviation in the friction between the frame 22 and the cylinder 21 which is seen in the prior art, thereby stable stopping positions being reproducible even by setting the changing ratio of pulse width to a uniform value.

Since some play is left in the rotational range of the lever 37, the lengths of the insulator 25b and the electrode 24 can be reduced so much that the circuit 23 can be compactly structured.

In the non-controlled section 42 where power is still supplied to the motor 32, the cylinder 21 can be moved speedily. Since the continuous control is started by the signals (b) coming from the circuit 23, the most appropriate timing for starting control can be selected.

Various changes and modifications may be effected within the spirit and scope of this invention as described hereinabove, not limited by the embodiment.

For example, the circuit 23 is not limited to a composition of the sliding-type short-circuiting piece 27 and the electrodes 24 to 26 and may detect positions by using a photocoupler, by utilizing electrostatic capacity, or by adopting magnetism. Any arbitrary composition may be adopted if it is simple and can detect the position of the cylinder 21.

The signals (a) are not limited to six pulses and the number of pulses may be freely selected in accordance with the specifications of the mechanical parts. Division of a cycle in ten sections is not always required, and if the changing ratio of pulse widths is set to a larger one, division into less than ten sections will be sufficient, and if more precise control is required, division into more than ten sections may be used.

In FIG. 14, 51 represents a release switch which can be operated from an external side and comprises a mechanical switch that starts a photographing action of a camera; 52a and 52b represent pull-up resistance comprise, 3 represents a pull-up resistance comprising a means for starting a focal-length changeover in order to select the focal lengths; 54 represents a T/W switch comprising a mechanical momentary switch that can be operated from an external side; D1 and D2 represent diodes for preventing short-circuiting, respectively; 55 through 58 represent components comprising a means for detecting the position of the lens barrel, with 55 being a switch to detect a wide-angle side position (hereinafter called "position W") which comprises an electric contact to detect the position W as the second setting position, 56 represents a switch to detect a telescopic side position (hereinafter called "position T") which comprises an electric contact to detect the position T as the first setting position, and 57 and 58 represent pull-up resistances, respectively; and 59 represents a pull-up control circuit which comprises a pull-up control transistor 59a, a bias resistance 59b connected between the base and emitter of the transistor 59a, and a base resistance 59c series-connected to the base of the transistor 59a. 60 represents a control unit (hereinafter called "CPU") which acts as a controlling means incorporating a timer (TM) as a timing means and a direction flag (FG) as a means for judging a driving directions. In this CPU 60, CM1 and CM2 are a controlling output terminal which produce an electric motor ON/OFF signal (r) and T/W signal (q), respectively; INTO represents an interruption input terminal to start interruption of the CPU 60 when applied signals are changed into L level ones; RL and T/W represent identifying input terminals for identifying sources of the interruption and are composed in a manner so that they may identify the sources when they are changed into L-level signals by closing the switch 51 or the switch 54, respectively. CTL represents a control output terminal which keeps H level and produces L level signals when putting the circuit 59 in operation, and TWW and TWT represent input terminals.

A flange 62a is disposed at the fore end of the moving mirror cylinder 62 housing and supporting the main lens system as a lens unit moving in accordance with changeover of the focal lengths. An arm 62b for driving the cylinder 62 via a mechanical unit which is not shown is disposed at the rear end of the cylinder 62. The motor 63 for driving the cylinder 62 to the position T and to the position W (with arrow marks indicating the moving directions) via the mechanical unit not shown is energized by a power source 64 via the motor driving circuit 61 as a motor driving means. 65 represents an obstacle, for example, an operator's finger; 66 represents dust as foreign matter; and 67 represents the camera body which is partially omitted in this figure. The chain line represents the optical axis. The internal timer TM in the CPU 60 is preset to a predetermined time which is, at least, longer than the time which the cylinder 62 requires in order to move from the position T to the position T to the position W, or, an anticipated time for switching the focal length corresponding to the necessary and sufficient time for such switching, for example, 1.5 to 2 seconds if assuming that the moving time is 0.7 second.

There is given hereunder a description of the connections in the block diagram in FIG. 14 which shows one embodiment of the third apparatus according to this invention.

One end of the respective resistances 52a, 52b and 53 is parallel-connected with the positive voltage of the pull-up power source +V and with the emitter of the transistor 59, while the other end of the resistance 52a is connected to the switch 51 and one end of the switch 54 via the diodes D1 and D2 in the forward direction as well as with the input terminal INTO. The other end of the resistance 52b is directly connected to an end of the switch 51, to the input terminal RL, and to the cathode side of the diode D1. The other end of the resistance 53 is directly connected to one end of the switch 54 and to the input terminal T/W and the cathode side of the diode D2. The switches 51 and 54 each is grounded at the other end thereof, respectively The resistances 57 and 58 each is connected to the collector side of the transistor 59 at one end thereof, while the resistances 57 and 58 connected to one end of the switches 55 and 56 at the other end thereof, respectively and to the input terminals TWW and TWT of the CPU 60, respectively, with the switches 55 and 56 each being grounded at the other end thereof. The base of the transistor 59 is connected to the output terminal CTL via the resistance 59c. The output terminals CM1 and CM2 are connected to the input terminals ON/OFF and T/W of the circuit 61. The circuit 61 is constructed to connect the power source 64 to the motor 63 so as to stop the motor 63 if the signal (r) given to the input terminal ON/OFF is of L level and to start the motor 63 if the signal (r) is of H level and to drive the cylinder 62 in the direction to project from the position W to the position T if the signal (q) is of L-level and to drive the cylinder 62 in the direction to retreat it from the position T to the position W if the signal (q) is of H level. The switches 55 and 56 are constructed to be closed at the time when the cylinder 62 reaches the position W and the position T, respectively, so as to produce L-level signals which act as detecting signals.

There is given hereunder a description of the operation of the focus-selecting mechanism of a camera of this invention. The main lens unit housed in and supported by the cylinder 62 is always set in the photographing optical axis and can be slided along the optical axis. The converter lens unit not shown is to be inserted in the photographing optical axis, if the cylinder 62 is at the position T, and is set near the film aperture surface. The converter lens unit is constructed to retreat from the photographing optical axis if the cylinder is set to the position W. Both the cylinder 62 and the converter lens unit are constructed to be set as in the case with the position W. Therefore, the direction flag FG in the CPU 60 keeps the state of setting to the position W as information on the direction.

Figure 15:
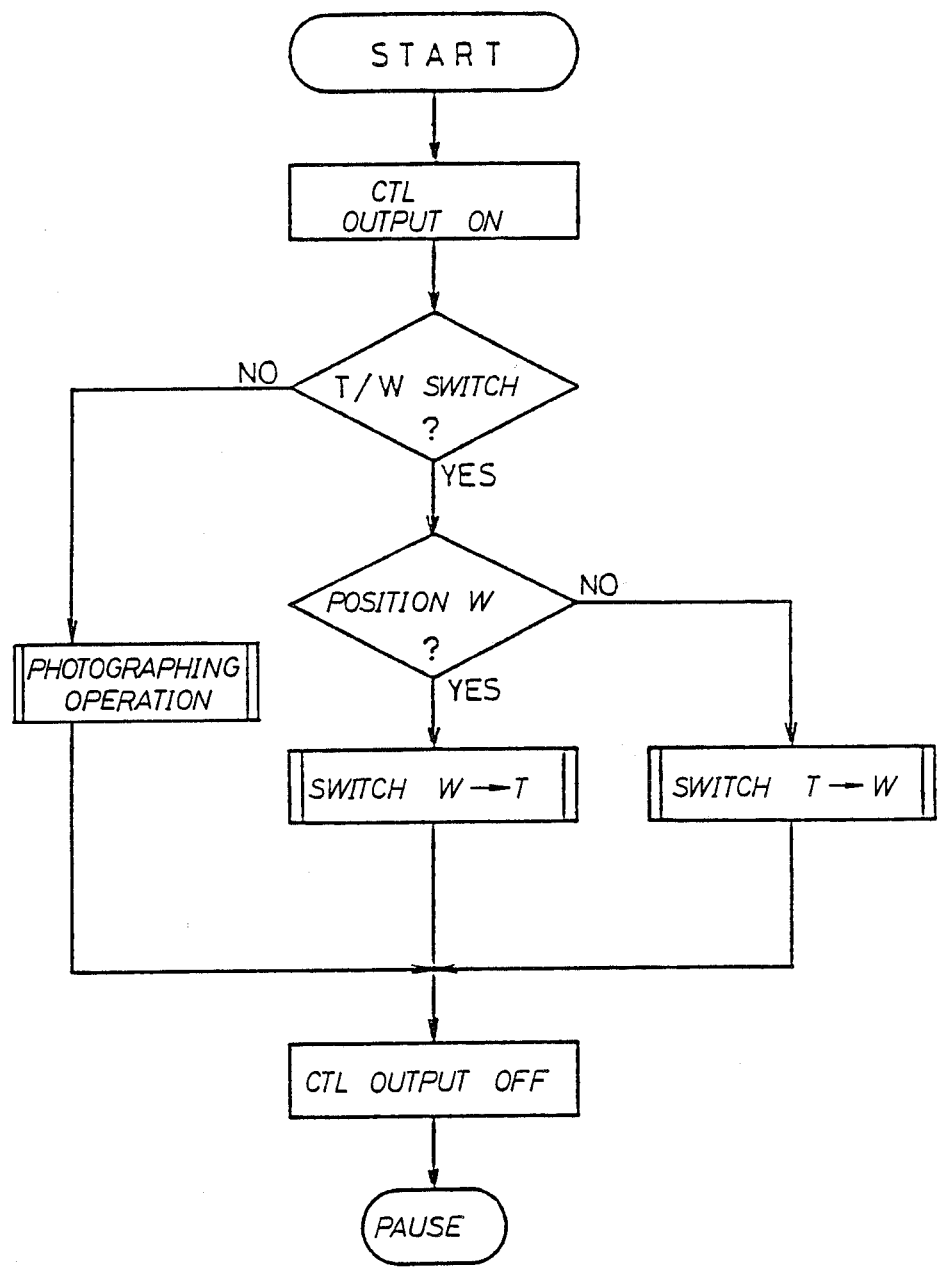
FIG. 15 is a mainrouting of a flow chart showing the operation of one embodiment of the third apparatus.
Figure 16:
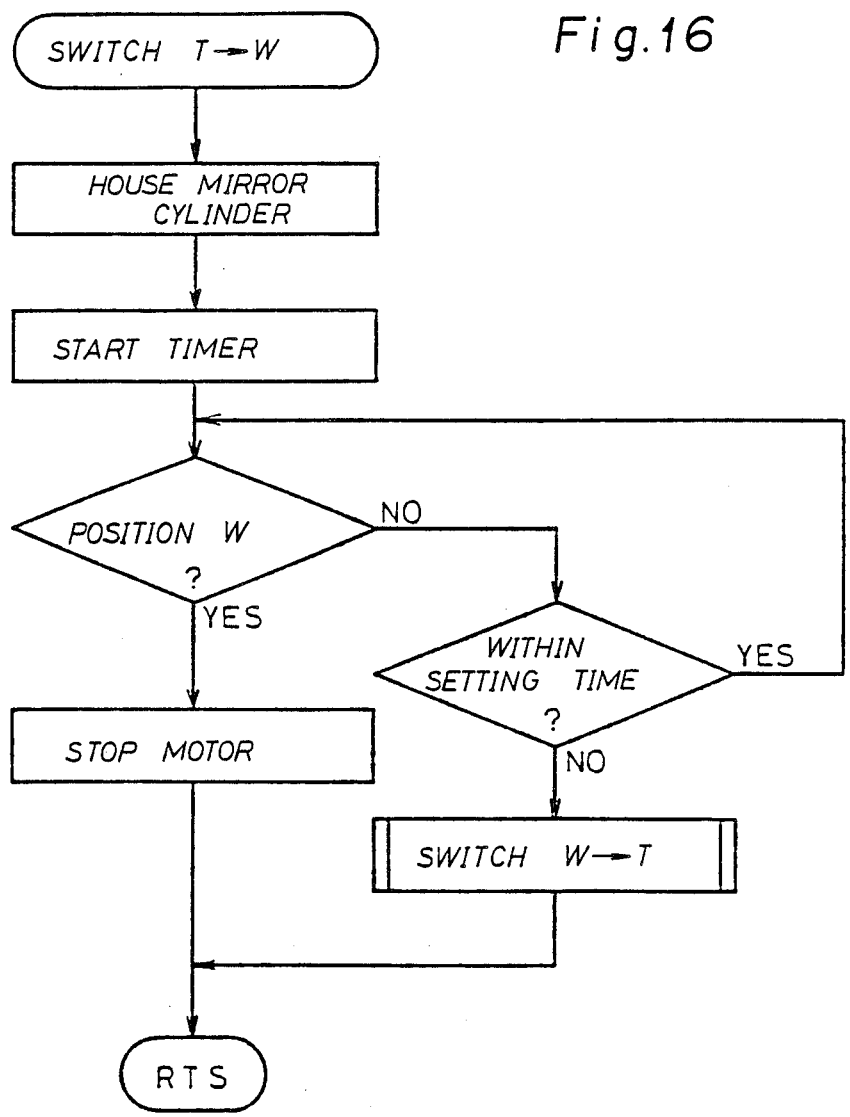
FIG. 16 is a subroutine of the flow chart showing the operation of one embodiment of the third apparatus.
Figure 17:
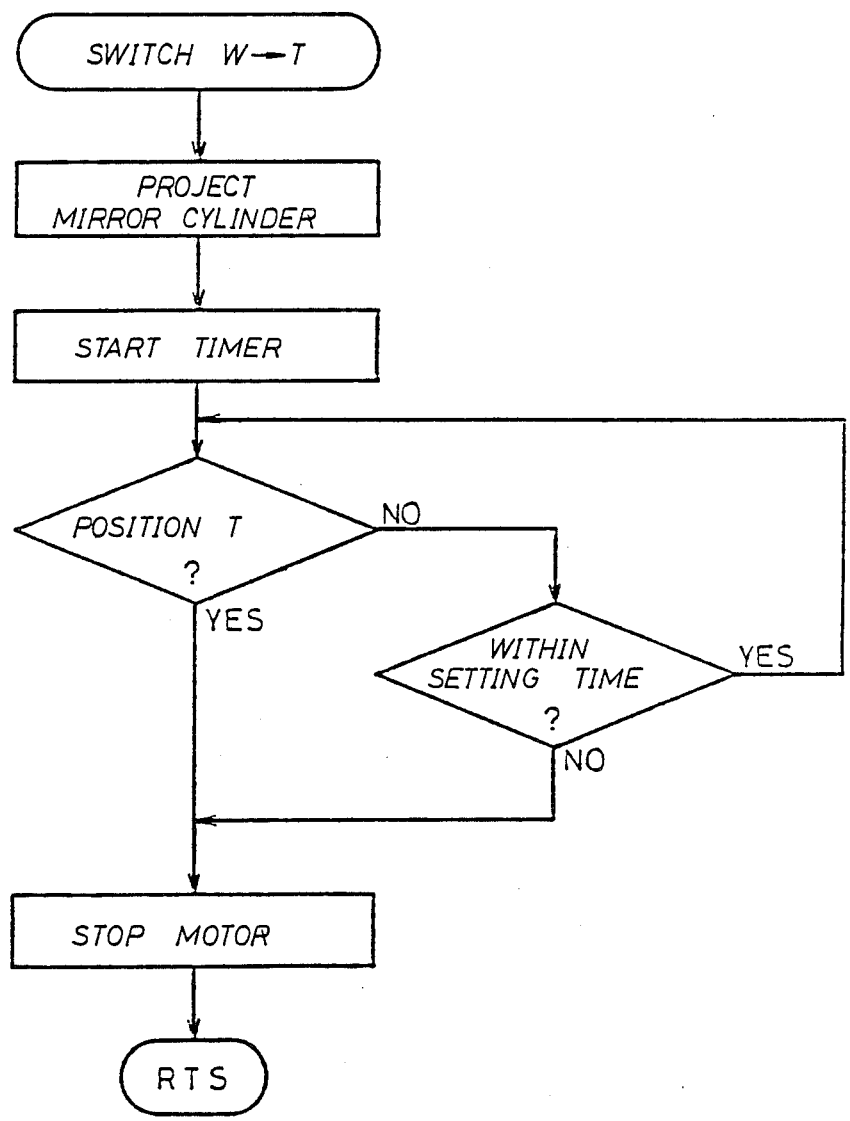
FIG. 17 is another subroutine of the flow chart showing the operation sequence of one embodiment of the third apparatus.

There is given hereunder a description on the operation of the embodiment arranged as stated above by referring to the flow charts in FIGS. 15 through 17. The flow in the flow chart shown in FIG. 15 starts when the signals given to the input terminal INTO in FIG. 14 are changed into L level.

Assume that the device is set to the initial state in which the cylinder 62 is located at the second setting position (namely, the position W). When the switch 54 is closed in this state, the signals transmitted to the input terminal INTO of the CPU 60 are changed into the L level, thereby the CPU 60 starting the operation as shown in FIG. 15 from the point of "START". First of all, the CPU 60 changes the level of the output terminal CTL to the L level, thereby the transistor 59a being turned ON and both of the input terminals TWW and TWT of the CPU 60 being pulled up by means of the resistances 57 and 58. In other words, the CPU 60 is now capable of reading signal levels of both input terminals TWW and TWT. In the next branching process of "T/W switch?", checking is effected as to which of the input terminals RL or T/W is at the L level. Since the switch 54 is closed in this case, the input terminal T/W is at the L level, and the CPU recognizes that the interruption source is the switch 54, thereby selecting YES. As a matter of reference, in this case, NO is selected in this branching process when the switch 51 is closed, thereby a prefixed photographing operation being carried out.

In the next process of "Position W?", the internal direction flag FG is checked. Being at the initial state, the flag FG indicates the position W, thereby YES being selected to proceed to the subsequent subroutine "Switch W→T". FIG. 17 displays the contents of this subroutine.

There is given hereunder a description of the operation to switch from W to T by referring to FIG. 17. In the process of "Project mirror cylinder", the CPU 60 changes the signals (q) of the output terminal CM2 into the L level to inform the circuit 61 that it should be driven in the direction to the cylinder 62 from the camera body or in the direction towards the position T, and then it changes the signals (r) of the output terminal CM2 to the H level to rotate the motor 63 in the position T direction. Then, the cylinder 62 starts moving leftward in FIG. 14. In the next process of "Start timer", the timer TM is cleared to zero and is caused to start timing operation. In the next branching process of "Position T?", the signal level of the terminal TWT is checked. Since the cylinder 62 does not yet reach the position T as it just starts moving, the switch 66 is set to the state as shown in FIG. 14 (namely, it is opened), thereby NO being selected. In the next process of "Within setting time?", checking is effected as to whether or not the timer TM passes a preset time (time set to switch), for example, 2 seconds in this embodiment. Since the operation just starts in this process, too, YES is selected and the sequence is returned again to the process "Position T?" and repeats the above-mentioned procedures. We temporarily call this operation loop as "projection checking loop". When the cylinder 62 reaches the position T thereafter, the switch 66 is closed, YES is selected in the process of "Position T?" in the projection checking loop to leave this loop, the signals (r) are changed into the L level in the next process of "Stop motor" to stop the operation of the motor 63, and the position T is notified to the flag FG, thereby the projecting operation being completed. In the final process of RTS, the operation is returned to the main routine in FIG. 15.

In FIG. 15, the CPU 60 changes the signal of the output terminal CTL into the H level in the process of "CTL output off" to turn off the circuit 59 and then it suspends operation. The cylinder 62 is located as shown in FIG. 14 at this moment.

There is given hereunder a description of occurrence of abnormalities which are caused by, for example, an operator's finger 65 or dust 66 contacting with or existing at the external periphery of the cylinder 62 as shown in FIG. 14. If the switch 54 is closed in this state, the similar operation as stated above applies to the processes from "Start" to the branching process "Position W?". Since the flag FG is renewed to the position T, NO is selected in this branching process, thereby entering the subroutine of "Switching from T to W". Then, the operation is carried out in accordance with the flow chart of the subroutine shown in FIG. 16. In the process of "House mirror cylinder", first of all, the CPU 60 changes the signals (q) and (r) into the H level to cause the motor 63 to rotate in the direction to house the cylinder 62 in the camera body, thereby the cylinder 62 starting rightward movement. In the next process of "Start timer", the internal timer TM is cleared to zero and is caused to start timing operation as described above. In the next process of "Position W?" the signal level of the input terminal TWW is checked, and since the switch 65 is still opened because the operation just starts, NO is selected. Similarly in the next process of "Within setting time?", YES is selected since it does not pass so much time, and the sequence is returned again to the "Position W?", thereby the same operation being repeated thereafter. We temporarily call this operation loop as "housing checking loop".

When the cylinder 62 reached the position W thereafter, YES is selected in the process of "Position W?" in the housing checking loop to leave this loop, and the CPU 60 stops operation in the similar manner as described in the projecting operation shown in FIG. 17. In this case, however, there is to occur an abnormality in which an obstacle such as the finger 65 or dust 66 comes between the camera body 67 and the flange 62a or is bitten in an opening through which the camera body 67 and the external periphery of the cylinder 62 slide with each other, thereby locking the cylinder 62 at a location before it reaches the position W. This means that it is impossible to leave the housing checking loop by selecting YES in the process of "Position W?" in the checking loop. In this embodiment, however, NO is to be selected in the process of "Within setting time?" of the housing checking loop when the preset switch time of two seconds passes, thereby the sequence leaving from the checking loop and entering the following subroutine of "Switch W→T" which leads to the flow chart of the subroutine as shown in FIG. 17. Since the contents of the operation in FIG. 17 is already described, we omit the description only by comparing the operation with the contents of the flow chart. Immediately after the CPU 60 recognizes the abnormality, it causes the motor 63 to reversely rotate to allow the cylinder 62 to project in the direction toward the position T and starts the timer TM to cause the operation to enter the projection checking loop. If the cylinder 62 can reach the position T, the same operation as stated above will be carried out, finally the CPU stopping the operation.

Assuming, however, that a new obstacle (not shown) appears at the top end of the cylinder 62 to prevent it from reaching the position T at the time the cylinder 62 projects to an extent that the finger 65 or dust 66 may leave from the said state in which the finger 65 or dust 66 is caught as above, it will be impossible to leave from the process of "Position T?" in the checking loop, but just after two seconds already passes in the process of the "Within setting time?" the operation of the motor 63 is suspended, thereby the projecting operation being stopped. By adopting such a construction as, for example, an alarm is given to the photographer to the effect that the cylinder 62 does not stop at the normal position at this moment, the photographer who takes notice of such an abnormality will remove the obstacle and turn the switch 54 on again, thereby the cylinder 62 being set at the normal position W in accordance with the flow charts shown in FIGS. 15 and 16. By closing the switch 51 thereafter, the photographing operation will be resumed freely.

As has been described above, this embodiment has such a construction as the cylinder 62 is immediately projected toward the position T when it does not reach the position W within a predetermined time for some reasons while it is driven toward the position W, and even if the finger 65 and dust 66 are caught between the camera body 67 and the cylinder 62, it is possible to immediately free them from the said state, thereby providing such merits to avoid or minimize injuries or damages to the finger and other physical parts, to allow dust to be easily removed, and to limit to a minimum the time duration for which excessive current is supplied to the motor 63, such merits to protect the gear systems in the mechanical unit from excessive loads and maintaining them in good states, and such other merits to offer the photographers with opportunities to take photographs since the cylinder can get rid of the abnormality so quickly that the photographing operation is resumed easily.

Since the motor 63 is designed to stop operation if a new abnormality occurs during the projecting operation to get rid of the said old abnormality, or in other words, since there is a double safety function, the finger 65 or the dust 66 which has just get rid of the abnormality may not be again caught, with any undesired influences being prevented from being given to the motor 63 and the said gear system.

Since the CPU 60 detects such an abnormality and immediately causes the cylinder 62 to project toward the position T, even if the members which carry out the housing operation in the mechanism be damaged, there are merits to allow the photographer to continue taking photographs, thereby losing the shutter chances is prevented from.

For example, the setting time of the timer TM may be freely selected rather than limiting it to 1.5 to 2 seconds if an appropriate time is selected for the moving time by considering the discharging capacity, anti-coldness, and other factors of batteries.

The driving direction may be recognized by identifying the states of the switches 55 and 56, not limiting to use of the direction flag FG, since this method has a merit to dispense with the flag FG.

The switch 54 should not be limited to a singleaction switch which is set to the two states, ON and OFF but may be a so-called seesaw switch or similar ones with the four states.

Figure 18:
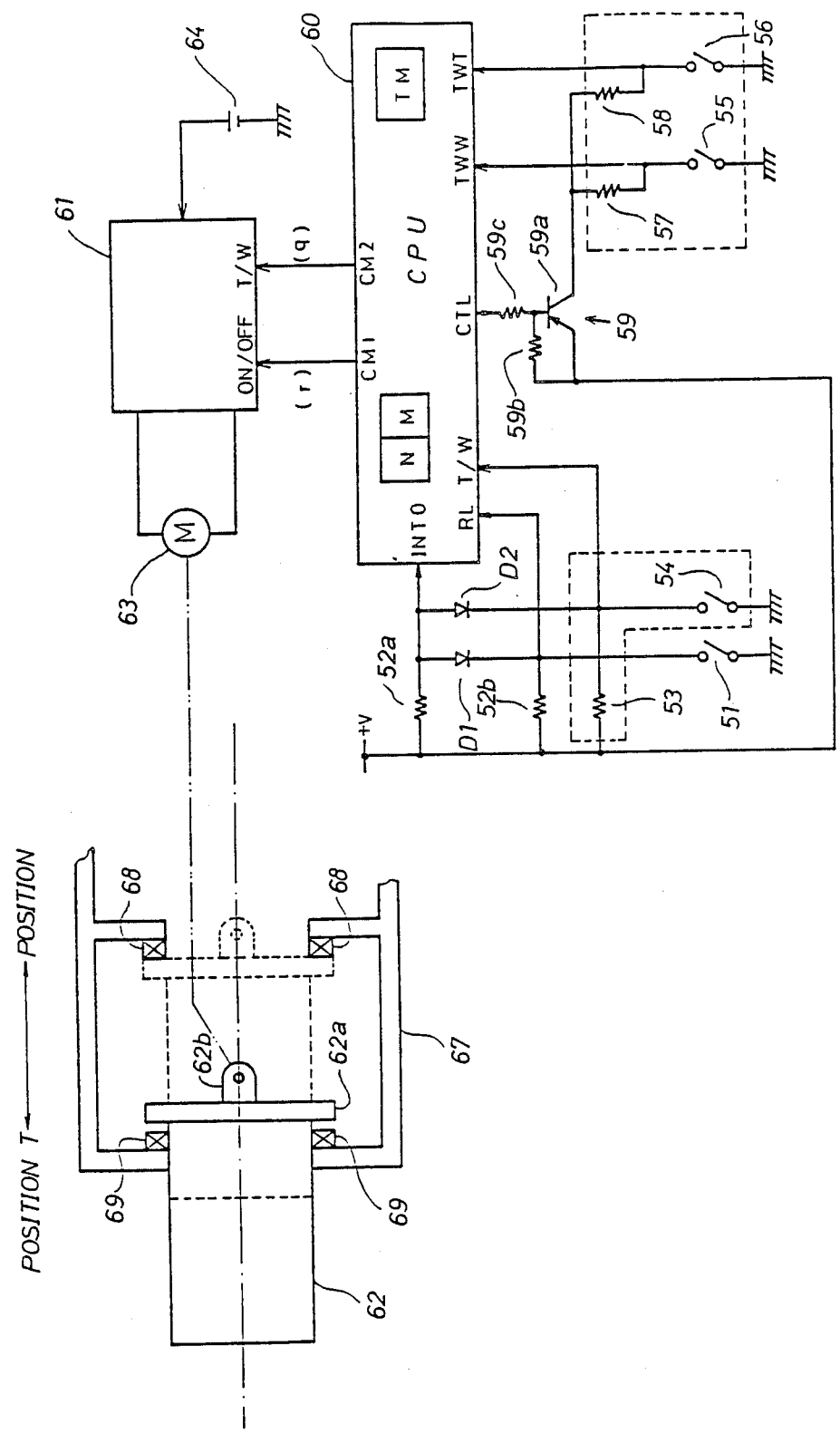
FIG. 18 is a block diagram showing one embodiment of the fourth apparatus according to this invention in a case where the moving mirror cylinder is positioned at a position T.
Figure 20:
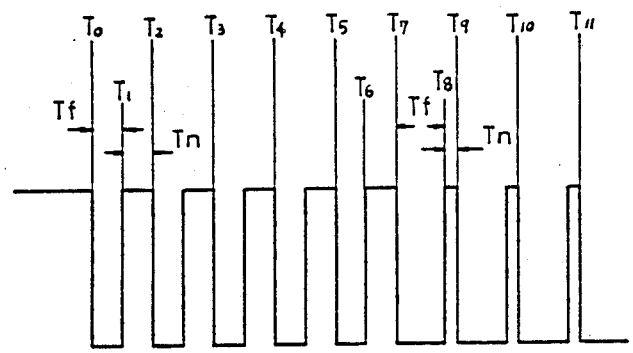
FIG. 20 is a timing chart showing an operational waveform of a current for the electric motor.

A detailed description of one embodiment of the fourth apparatus of this invention is described hereunder by referring to FIGS. 18 through 20.

Those components in FIG. 18 which are same with or similar to those in FIG. 14 are shown by using the same symbols and numbers, and any descriptions which are overlapped between these two figures are omitted herein.

A position W side stopper 68 is disposed at a location corresponding to the position W in the cylinder frame 67 which is an immobile part of and fixed to the camera body not shown in the figure, while a position T side stopper 69 is disposed at a location corresponding to the position T in the cylinder frame 67. The switches 55 and 56 are constructed to be closed and turned on just before the flange 62a contacts the stopper 68 or the stopper 69, respectively. The lens unit which moves in accordance with the operation to select a focal length includes a converter lens system in addition to a main lens system which is housed and supported by the cylinder 62, but it is represented by the cylinder 62 which shows more characteristic actions.

The connections in the block diagram in FIG. 18 are basically similar to those in FIG. 14.

Actions in the focus-selecting mechanism of a camera under this present invention is described hereunder. The cylinder 62 is always arranged along the photographing optical axis and is constructed to be able to slide along the optical axis. At the position T, the cylinder 62 is projected forward and the converter lens unit which is not shown is inserted into the photographing optical axis and is set near a film aperture surface. At the position W, the cylinder 62 is housed backward in the camera body with the converter lens unit being constructed to be retreated from the photographing optical axis and to go away from the film aperture surface. At the initial state, the cylinder 62 and the converter lens unit are constructed to be set to the position W.

The actions of this embodiment which is composed as described above is described hereunder, by referring to the flow chart in FIG. 19. The flow shown in the flow chart in FIG. 19 are started when the signals to be given to the input terminal INTO are changed into L level.

Assume that the device is set to the initial state; the cylinder 62 is located at the second setting position (the position W) as shown by using hyphenated lines. When the switch 54 is closed at this state, the signal in the input terminal INTO of the CPU 60 is changed into the L level. First of all, the CPU 60 checks which of the input terminals RL and T/W is set to the L level. The CPU recognizes that the input terminal T/W is set to the L level, since the switch 54 is closed in the present stage and that the interruption source is the switch 54, thereby the procedures in the flow chart in FIG. 19 starting from the process of "Start". In the process of "CTL output ON", the CPU 60 changes the signal level of the output terminal CTL to the L level, thereby the transistor 59a being turned on and the input terminals TWW and TWT of the CPU 60 being pulled up by way of the resistances 57 and 58. Now, the CPU 60 is in the position of reading the signal levels of the two input terminals TWW and TWT. Since the flange 62a of the cylinder 62 is in contact with the stopper 68 as shown in FIG. 18, the switch 55 is already closed and the signals entered in the input terminal TWW is changed into the L level. Therefore, the CPU 60 detects the fact that the cylinder 62 is now set to the position W and that the cylinder 62 should be driven to the position T, thereby changing the signals (q) into the L level and the signals (r) into the H level. The circuit 61 which then receives these signals determines the polarity of the driving signals to be applied to the motor 63 and applies it in a manner such that the motor 63 may rotate forward to drive the cylinder 62 to the position T, as a result of which the cylinder 62 starts to project to the position T. In the next process of "Start timer", the CPU 60 clears the builtin timer to zero and causes it to start timing. In the next branching process of "Position T?", signal levels of the input terminals TWW and TWT are checked as described above to confirm whether or not the cylinder 62 reaches the position T. Since the cylinder 62 just starts moving, both the switch 56 and the switch 55 are still set to the open (OFF) position as shown in FIG. 18, thereby NO being selected and the sequence being proceeded to the next branching process of "Within setting time?". Assuming that the moving time which is required for the cylinder 62 to move from the position T to the position W or vice versa is approximately, for example, one second, the limit time should be set to about two seconds so that the timer TM may check whether or not this limit time of two seconds exceeds, thereby, NO being selected by judging that there is some abnormalities such as obstacles, should it be exceeded. Then, in the process of "Stop motor", the signals (r) are changed into the L level to immediately stop the operation of the motor 63, and in the next process of "Turning off CTL output", the level of the CTL signals is changed to the H level, threby the operation being completed at the process of "End". The "Stop motor" and "CTL output off" are called "final operation" as a whole.

Since the operation is still within the limit time, YES is selected in the branching process and the operation is returned again to the process of "Position T?", thereby the procedures being repeated as above. This operation loop is called hereinafter "position detecting loop". While the CPU 60 engages in the operation in this position detecting loop, the cylinder 62 draws near the stopper 69 as illustrated with a solid line in FIG. 18. Then, the switch 56 is closed just before the stopper 69 is contacted, and the level of the signals in the input terminal TWT is changed to the H level, as a result of which YES being selected in the process of "Position T?" in the position detecting loop.

The principal part of the said embodiment under this invention. In the next process of "Clear counter N", the counter N is cleared to zero (N=0), and in the next process of "Turn off motor (A)", the signals (r) are changed into the L level, thereby power supply to the motor 63 being interrupted. This corresponds to the point T0 in FIG. 20, and this state is kept for, for example, 10 ms with the off time being Tf. In the next process of "Turn on motor (A)", the level of the signals (r) is raised again to the H level so that power may be supplied to the motor 63. This point corresponds to the point T1 in FIG. 20. This state will be kept for the ON time Tn, for example, for 10 ms. In the next process of "Add to counter N", a unity is added to the counted value of the built-in counter N. Since the counter is cleared to zero, or N=0, the new value is N=1, in this case. In the next process of "N=5?", the counter N is checked and NO is selected since presently N=1, thereby the operation of "Turn motor off (A)" being carried out. This is the point T2 in FIG. 20. Assuming that the duration between T0 to T1 is the first cycle, in other words, the output in this cycle is Tn/(Tn+Tf)=0.5, and therefore, chopper control at 50% output starts. (This operation loop is hereinafter called "50 percent output loop".) Then, the operation proceeds in the same manner to the second cycle (between the points T2 and T3), the third cycle (between T3 and T4), the fourth cycle (between T4 and T5), and the counter N indicates four (or N=4) at the time when the fourth cycle is completed. At the point T5, the operation for the fifth cycle starts by "Turn off motor (A)", at the point T6 the driving signal is changed into H level by "Turn on motor (A)", a unity is added to the value of the counter N in the process of "Add to counter N", thereby N=4+1=5 and then YES is selected to complete the 50 percent output loop to enter the next process of "Clear counter M", where the counter M in the CPU 60 is cleared to M=0. In the next process of "Turn off motor (B)", the signals (r) are changed into L level and the power supplied to the motor 63 is cut off. This is the point T7 in FIG. 20. This state is kept for the OFF time Tf, for example, for 15 ms, and the signals (r) are changed into H level in the next process of "Turn on motor (B)", thus the driving signals being applied to the motor 63. This represents the point T8. This state is kept for the ON time, for example, for 5 ms, and then a unity is added to the counted value of the counter M in the process of "Add to counter M", resulting in M=0+1=1. Since M=1 at present, NO is selected in the next process of "M=3?" to return to the process of "Turn off motor (B)" again, thereby power supplied to the motor 63 being cut off. This represents the point T9. Assuming that the duration between T7 to T9 is the first cycle, in other words, the output in this cycle is Tn/(Tn+Tf)=0.25, and therefore, chopper control at 25% output starts. (This operation loop is hereinafter called "25 percent output loop".) Then, the operation proceeds in the same manner to the second cycle (between the points T9 and T10) and the third cycle (between T10 and T11), and since the counter M indicates three (or M=3) at the third cycle, YES is selected at the branching process of "M=3?" and all the procedures are completed at the process of "END" aftrr the final procedure is finished.

In other words, the chopper control of the power to be supplied to the motor 63 is started at the point T0 which is just before the cylinder 62 abut against the stopper 69; it contacts the stopper 69 while the acceleration to drive the cylinder 62 is slightly reduced by the off time Tf of the first cycle in the 50 percent output loop; the elastic deformation in the driving system from the cylinder 62, the cylinder frame 67, and the motor 63 to the arm 62b is shifted in the opposite direction toward the position W as a result of the reaction of the abutting of the cylinder 62 against the stopper 69 as described in the description of the prior art, thereby resulting in the cylinder 62 being pushed from the position T where it should be stopped to the position W. Thereafter, however, the motor 63 continues driving it by means of the output in the first to the fifth cycles in the 50 percent output loop which cyclically reduce the driving power of the motor 63 and further continues driving it with the output in the first to the third cycles in the 25 percent output loop whose output is less than before, thereby the cylinder 62 coming to stand still at the position T after the elastic deformation repeats displacement several times while damping the amplitudes which are horizontal and centered at the position T in FIG. 18. Namely, the damping oscillation in the horizontal direction, centered at the position T is converged at the position T which is the central axis of the said amplitude while the operation is effected from the points T1 to T11.

Referring to the movement of the cylinder 62 from the position T to the position W, this movement is reverse to the movement of the cylinder 62 from the position W to the position T described above, being reverse to the description with the motor 63 rotating in the reverse direction in the process of "Start motor" and with the process of "Position T?" being replaced with that of "Position W?" after starting from the process of "START" and the operations themselves remaining unchanged at all while the timing chart in FIG. 20 which composes the principal part of this embodiment is same as before, thereby the description being omitted here.

Since a construction is adopted in the embodiment so that the power supplied to the motor 63 is subjected to chopper control of the output to 50% to reduce the output to be chopper-controlled at a fixed cycle from the point T0 immediately before the cylinder 62 abuts against the stopper 69 and the stopper 68, there occurs neither excessive driving nor insufficient one as has been case with the prior art so that the cylinder 62 may be driven to an accurate position, and moreover, the chopper control of the motor 63 after such contacting changes the movement of the elastic deformation in the cylinder 62, the frame 67, and the driving system into a damping oscillation so that the cylinder 62 may stop at the position T or the position W which is the center of such oscillation, thereby no displacement occurring in the stopping position which may otherwise be caused by reaction after such contacting.

Although an off period for the first cycle exists immediately before the flange 62a abuts against the stopper 69 or the stopper 68, there are no influences of deviations in friction between the frame 67 and the cylinder 62 or other deviations as seen in the prior art, because driving continues thereafter as described above, thereby the stopping positions stably reproduced even if the change ratio of the pulse widths is set to a constant value.

Since power is continuously supplied to the motor 63 before th point T0, the cylinder 62 can move quickly. The chopper controlling which is started depending on the changes in the state of the switches 55 and 56 enables to set the timing for starting controlling to an appropriate point.

For example, the 50 percent output loop should not be limited to the five cycles from the first to the fifth cycles, and the said 25 percent output loop should not be limited to the three cycles from the first to the third, thereby the number of cycles being increased and decreased within the range of the numbers which are appropriate for intended designs.

The output of the chopper control should not be limited to a combination of the 50% and 25%, and it may be constructed in a manner such that the output may be reduced from 100% to 80%, 60%, 40% and 20% in this order. In conclusion, the reduction ratio (ratio to reduce the outputs) may be freely selected, as long as the output of the chopper control is reduced at every unit time.

The limit time should not be restricted to two seconds and may be freely selected as long as abnormalities can be definitely detected and the required actions are not reversely affected.

The rotational direction of the motor 63 is not limited to the case that the driving to the position T is taken as forward rotation, and it may be in either direction depending upon the said driving system and the arranging space.

The counters M and N incorporated in the CPU 60, should not be limited to two, and a counter, for example, N may be alone used for the purpose. In such a case, the processes in the flow chart in FIG. 19 of "Clearing counter M", "Add to counter M", and "M=3?" may be replaced with "Clear counter N", "Add to counter N" and "N=3?" respectively.

The ON time Tn and OFF time Tf which realize the 50% output should not be restricted to 10 ms, respectively, and if selected in consideration with the relationship between the controlling accuracy and the controlling speed, the value may be increased or decreased. Additionally, the ON time Tn and OFF time Tf in the case of 25% output should not be restricted to 5 ms and 15 ms, respectively, being increased or decreased as described above.

A detailed description of one embodiment of the fifth apparatus of this invention is described hereunder.

Figure 21:
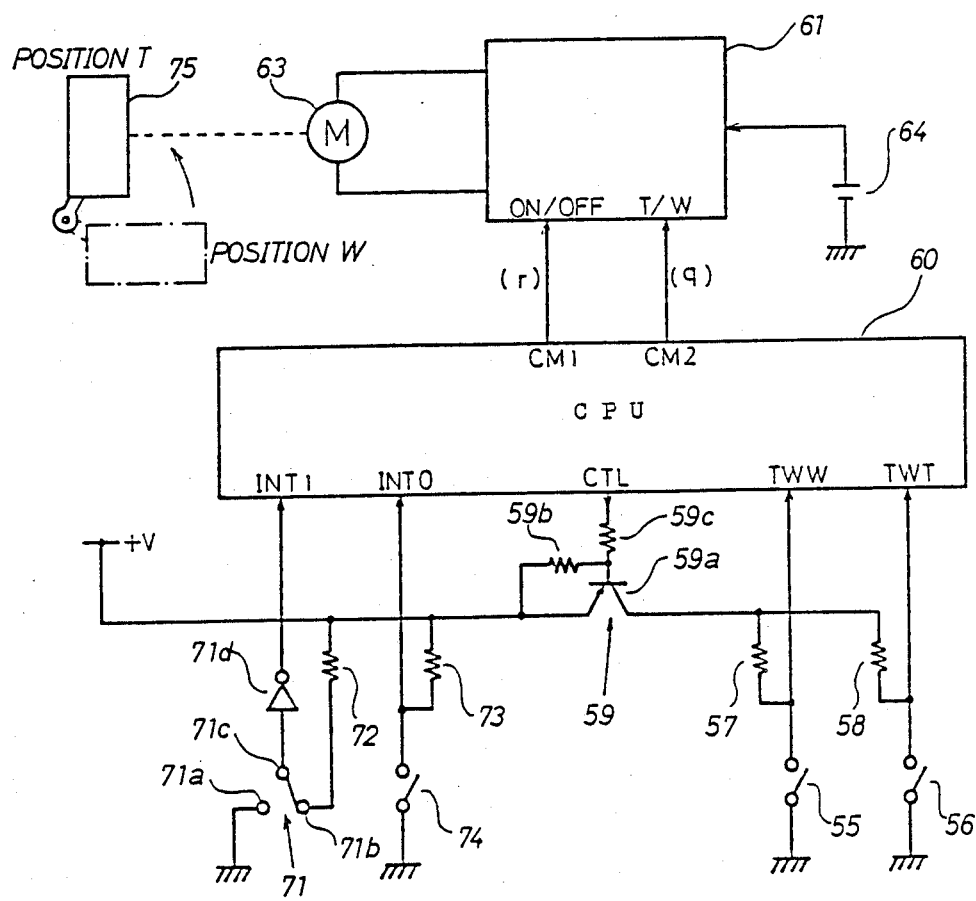
FIG. 21 is a block diagram showing one embodiment of the fifth apparatus according to this invention.

Those components in FIG. 21 which are same with or similar to those in FIG. 14 are shown by using the same symbols and numbers, and any descriptions which are overlapped between these two figures are omitted herein.

In FIG. 21, 71 represents a rear lid opening/closing switch comprises a mechanical switch interlocked with the camera rear lid; 71a represents a grounded closing side contact of the switch 71; 71b represents an opening side contact; 71c represents a common contact; 71d represents an inverter; 72 represents a pull-up resistance; 73 represents a pull-up resistance; and 74 represents a T/W switch comprising a mechanical momentary switch which can be operated from an external side.

75 represents a converter lens system moving as a result of switching the focal lengths and 63 represents an electric motor to drive the lens system 75 to a position T and a position W (which is shown by using a one-dot chain line) by way of a mechanical unit not shown in this figure.

There is given hereunder a description of connections in the block diagram shown in FIG. 21. One end of the resistances 72 and 73 is respectively parallel-connected to the pull-up power source and the emitter of the transistor 59a, the other end of the resistance 72 is connected to the opening contact 71b while the other end of the resistance 73 is connected to one end of the switch 74 and to the input terminal INT0, and the other end of the switch 74 is grounded. The common contact 71c of the switch 71 is connected to the input terminal INT1 by way of the inverter 71d, and the switch 71 is constructed so that the closing contact 71a and the common contact 71c of the switch 71 are connected when the rear lid (not shown) of the camera is closed and that the common contact 71c is connected to the opening contact 71b when the lid is opened. Other connections remain unchanged from those in FIG. 14.

There is given a description of the focal length selecting mechanism of the camera in this embodiment. Although not shown, a main lens unit is always arranged along the photographing optical axis and is constructed to slide along the photographing optical axis. When the position T is selected, the main lens unit is projected forward while the converter lens unit 75 is inserted in the photographing optical axis and is set near the film aperture surface. When the position W is selected, the main lens unit is retreated backward while the converter lens unit 75 is dislocated from the photographing optical axis and goes away from the film aperture surface. The mechanism is also constructed that both the main lens unit and the converter lens unit 75 are set to the position W at the initial state.

Figure 22:
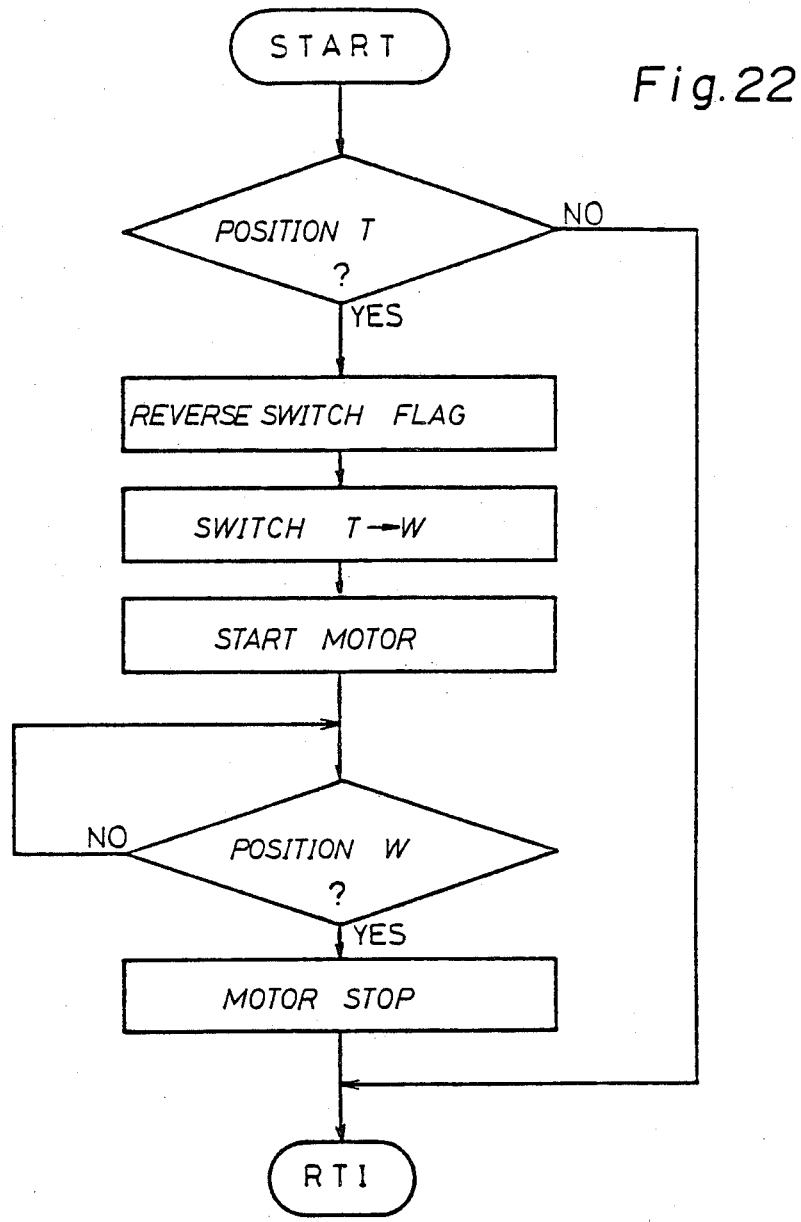
FIG. 22 is chart showing the rear lid opening operation sequence of the apparatus of FIG. 21.
Figure 23:
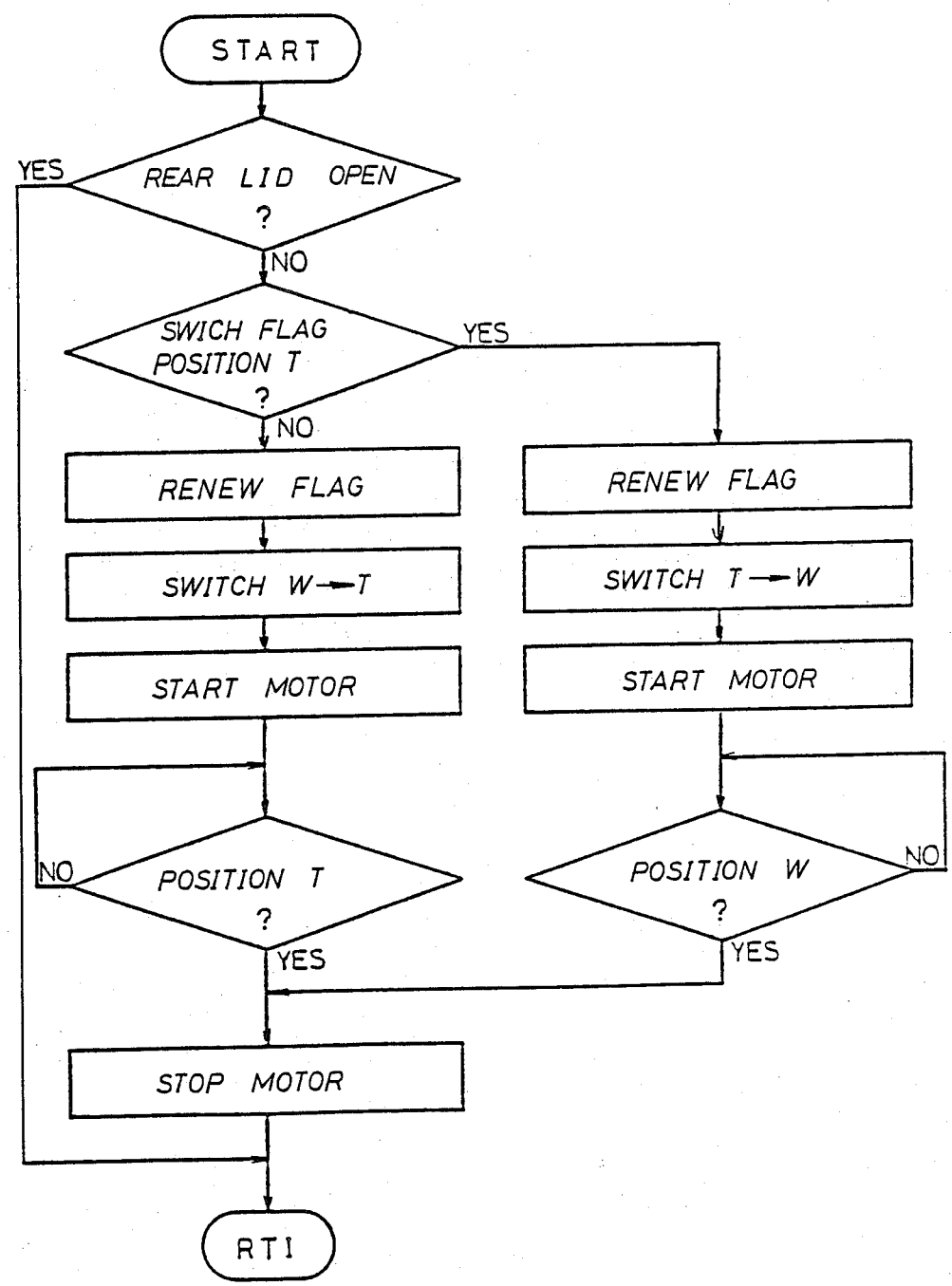
FIG. 23 is a flow chart showing the change-over operation sequence of the moving mirror cylinder of the apparatus of FIG. 12.

Descriptions of FIGS. 22 and 23 are omitted here since they are detailed in the description of operation below. As a matter of reference, the operation to open the rear lid shown in FIG. 22 is started when the level of the signals to be given to the input terminal INT1 is changed into L level in FIG. 21, and the selecting operation in FIG. 23 is started when the level of the signals to be given to the input terminal INT0 is changed into L level.

Figure 24:
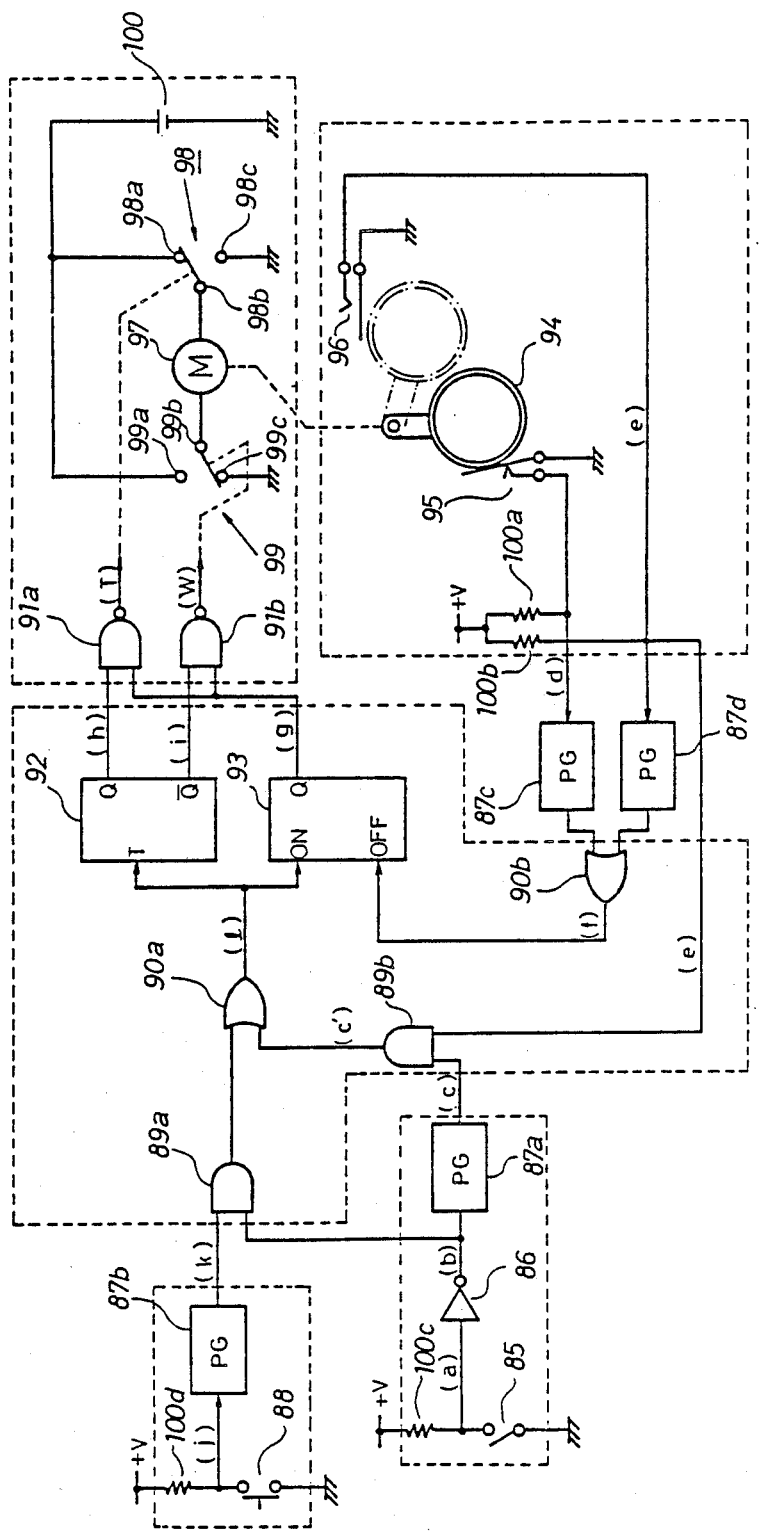
FIG. 24 is a block diagram showing another embodiment of the fifth apparatus.
Figure 25:
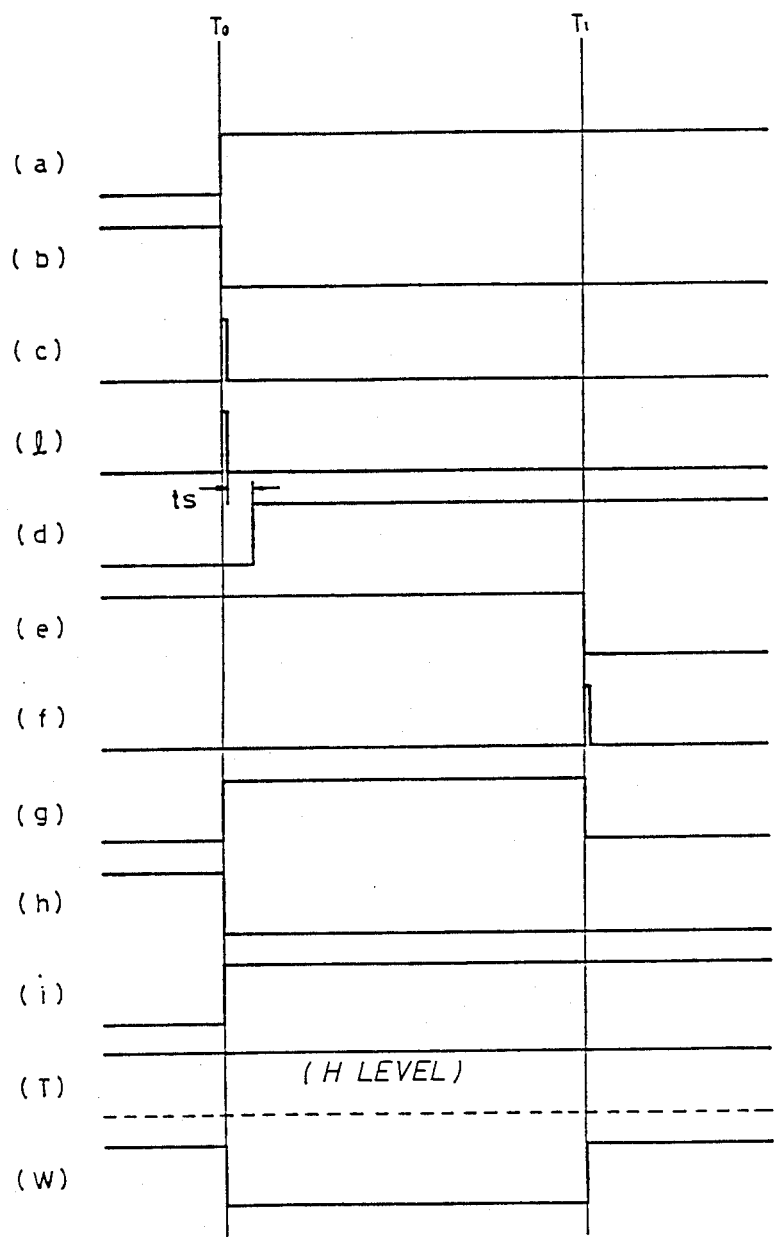
FIG. 25 is a timing chart showing the operation waveforms of each component of the apparatus of FIG. 24.
Figure 26:
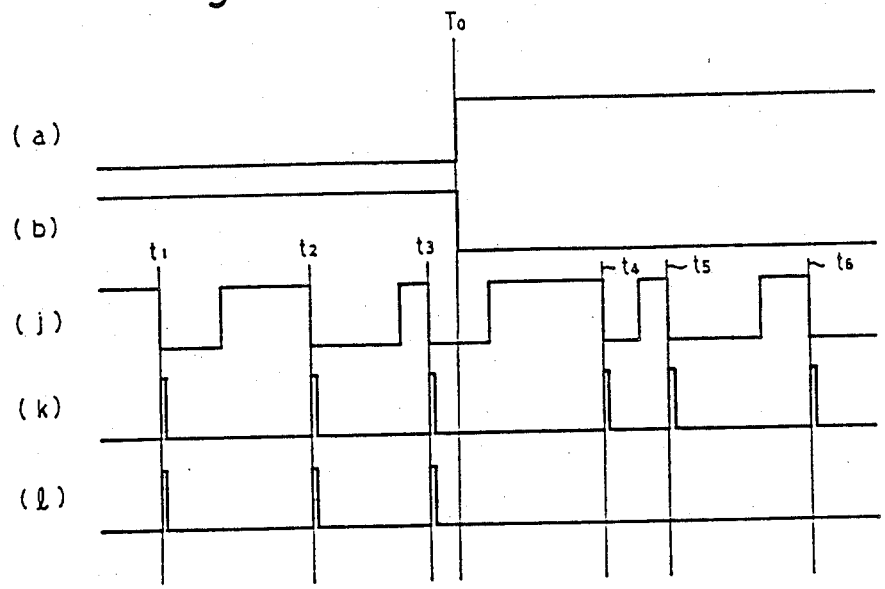
FIG. 26 is a timing chart showing the change-over operation sequence of the moving mirror cylinder of the apparatus of FIG. 24.
Figure 27:
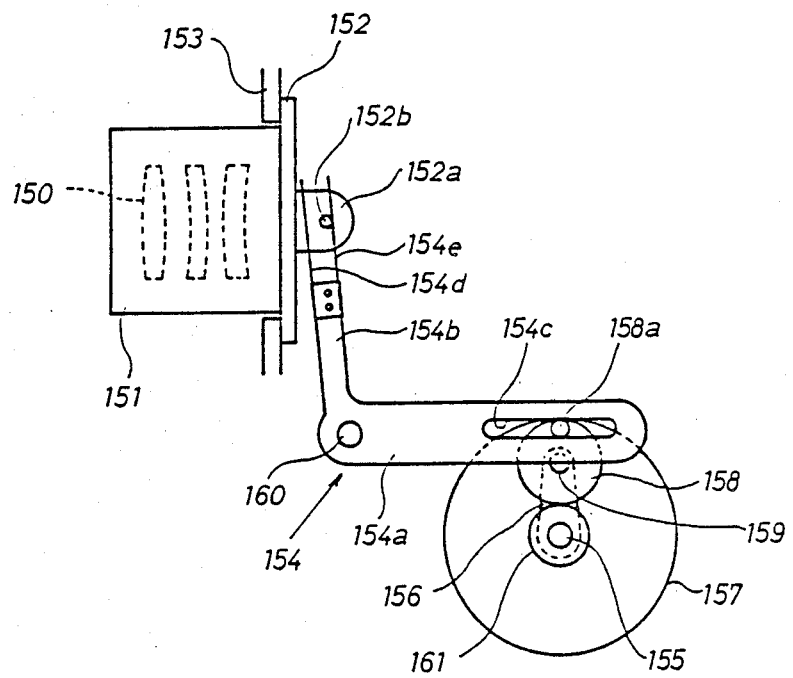
FIG. 27 is an elevational view of the prior art.

FIGS. 24 to 26 relate to the other embodiment of the fifth apparatus of this invention.

In FIGS. 24, 85 represents a rear lid opening/closing switch comprising a mechanical switch to be opened when the camera rear lid (not shown) is opened and to be closed when it is closed; 86 represents an inverter to receive the output of the switch 85; 87a to 87d represent pulse generators which are constructed to generate a pulse only when the input signal is changed to L level; 88 represents a T/W switch comprising a momentary push button switch which is operated from an external side; 89a and 89b represent a positive logic two-input AND gate, respectively; 90a and 90b represent a positive-logic, two-input OR gate, respectively; 91a and 91b represent a positive-logic two-input NAND gate; 92 represents a toggle-type flip-flop (hereinafter abbreviated as "T-FF") which reverses the state of output for every additional input of a pulse; 93 represents a set/reset flip-flop (hereinafter abbreviated as "RS-FF") which enters a set mode to change the output terminal Q into H level when a pulse is given to the input terminal ON and enters a reset mode to change the output terminal Q into L level when a pulse is given to the input terminal OFF; 94 represents a converter lens unit which moves in accordance with selection of the focal lengths; 95 represents position T detecting switch comprising an electric contact with an actuator which is closed when the lens unit 94 reaches the position T as the first setting position; 96 represents position T detecting switch to be closed in the same manner when the lens unit 94 reaches the position W as the second setting position; 97 represents an electric motor to drive the lens unit 94 to the positions T and the position W by way of the mechanical unit not shown; 98 and 99 represent an electric motor driving switches comprising an electronic switches including a transistor to control ON/OFF operation and rotational direction of the electric motor, with 98a and 99a being the position T side contact and position W side contact, respectively, 98b and 99b being common contacts, respectively, and 98c and 99c being position W side contact and position T side contact, respectively; 100a to 100d represents a pull-up resistance, respectively; 100 represents a power source for the motor 97; +V represents a pull-up power source; and (c') represents output pulses.

There is given hereunder a description of the connections in the block diagram shown in FIG. 24. One end of the switch 85 is connected to the power source +V by way of the resistance 100c and to the input end of the inverter 86 while the other end of the switch 85 is grounded; the output end of the inverter 86 is parallel-connected to the second input end of the AND gate 89a and the input end of the circuit 87a while the output end of the circuit 87a is connected to the first input end of the AND gate 89d. An end of the switch 88 is connected to the power source +V via the resistance 100d and to the input end of the circuit 87b while the other end of the switch 88 is grounded, and the output end of the circuit 87b is connected to the first input end of the AND gate 89a while the output end of the AND gates 89a and 89b is respectively connected to the first and second input ends of the OR gate 90a. The output end of the OR gate 90a is parallel-connected to the input terminal T of the T-FF 92 and the input terminal ON of the RS-FF 93 while the reset input terminal OFF of the RS-FF 93 is connected with the output end of the OR gate 90b. The output terminals Q and Q' of the T-FF 92 are connected respectively to the first input end of the NAND gates 91a and 91b, the output terminal Q of the RS-FF 93 is parallelconnected to the second terminals of the NAND gates 91a and 91b. The common contacts 98b and 99b of the switches 98 and 99 are connected to the positive and negative poles of the motor 97, respectively, the contacts 98a and 99a are connected to the positive pole of the power source 100 while the negative pole of the power source 100, the contact 98c, and the contact 99c are grounded, respectively. As indicated by means of a dotted line, the contact 98b is constructed to be connected to the contact 98a when the signal (T) at the output end of the NAND gate 91a is an L-level one and to the contact 98c when it is an H-level one. Similarly, the contact 99b of the switch 99 is constructed to be connected to the contact 99a when the output signal (W) of the NAND gate 91b is an L-level one and to the contact 99c when it is an H-level one. An end of the switches 95 and 96 is respectively grounded and the other end is connected to the input end of the circuit 7c and 87d and to the pull-up power source +V by way of the resistances 100a and 100b, respectively. The output ends of the circuits 7c and 87d are connected to the first and second input ends of the OR gate 90b, respectively and are parallel-connected to the input end of the circuit 87d and the second input end of the AND gate 89b. As a matter of reference, the lens unit 94 and the main lens unit (not shown) are set to the position W in the initial state, and both the T-FF 92 and the RS-FF 93 are constructed to be in the reset mode in which the signals of the output terminal Q are changed into L level.

In FIGS. 25 and 26, (a) represents a rear lid opening/closing signal; (b) represents a reverse opening/closing signal; (c) represents an opening pulse; (d) represents a position T signal, (e) represents a position W signal; (f) represents a stop pulse; (g) represents an on/off signal; (h) and (i) represent, directional signals; respectively; (T) and (W) represent, switch-driving signals, respectively; (j) represents a starting signal, (k) represent a starting pulse; and (l) represents a start pulse. T0 represents a timing at which the rear lid is opened; T1 represents a timing at which the converter lens unit 94 is driven to reach the position W; ts represents a timing at which the switch 95 which is turned ON is turned off; and t1 to t6 represent timing at which the switch 98 is closed, respectively, with the time interval between each set of adjacent timing from t1 to t6 being freely selectable.

The operation of the embodiments constructed as described above is described hereunder.

There follows a description of the operation of one embodiment of the fifth apparatus of this invention by referring to FIGS. 21 to 23. First of all, the operation to open the rear lid is described by referring to FIGS. 21 and 22. Assume that the device is set to the initial state in which the lens unit 75 is located at the second setting position (position W). When the rear lid is opened in this state, the contact point 71c of the switch 71 is connected to the contact point 71b, thereby the signal level of the terminal INT1 of the CPU 60 being changed into L level. At this timing, the CPU 60 starts the rear lid opening operation from the process of "START" in FIG. 22. Then, the CPU 60 reduces the signal of the terminal CTL into an L level one, and the transistor 59 being turned on, thereby the terminals TWW and TWT of the CPU 60 being pulled up by way of the resistances 57 and 58. Then, the CPU 60 reads the signal levels of the input terminals TWW and TWT. Since the lens unit 75 is set to the position W at present, the switch 55 is closed and the level of the signal to be given to the terminal TWW is L level, thereby the CPU 60 detecting the fact that the lens unit 75 is located at the position W and changing the level of the signal to the terminal CTL into H level. In the branching process of "Position T?" NO is selected and in the process of "RTI", the flow returns to that which is just before entering interruption. In other words, the focal length selecting mechanism does not work at all, even if the rear lid is opened, if the rearmost surface of the lens unit 75 is set to the position W which is far from the film aperture surface.

Now, there follows a description of the selecting operation shown in FIG. 23 with the rear lid opened. When the switch 54 is closed, the signal level at the terminal INTO is changed into L level, thereby the selecting operation being started from the process of "START". The CPU 60 checks the signal level of the contact point 71c of the switch 71 through the terminal INT1. Since the signal level of the contact 71c is H level, the CPU 60 which reads it as L level through the function of the inverter 71d recognizes that the rear lid is opened. In the process of "Rear lid open?" YES is selected and the flow is returned to that which is just after interruption is applied at the process RTI. This results in prohibition of the output from the switch 54, thereby the focal length selecting mechanism not working at all.

This means that the procedure to prohibit output of the switch 54 prevents the lens unit 75 from moving toward the position T where it may easily be smeared, when the switch 54 is closed by inadvertent or intentional operation of the camera user while the lens unit 75 is set to the position W where it is almost free from damages and smears while the rear lid is opened.

When the switch 54 is closed by closing the rear lid, the selecting operation in FIG. 23 is started in the same manner as stated above, and NO is selected in the process of "Rear lid open?"

Prior to proceeding to a description of further operation, there is given hereunder a description on a switch flag. The switch flag which is composed by the internal register of the CPU 60 and is reversed at every additional driving of the lens unit 75 and stores the previous driving direction of the lens unit 75 in memory. Since the lens unit 75 has not been driven at all in this case, the switch flag indicates the position W as in the initial state. In the next process of "Is switch flag for position T?" the CPU 60 selects NO, in the process of "Renew the flag", it renews the switch flag from the position W to the position T, in the process of "Position W→T", it reduces the signal (q) which is the output of the terminal CM2, and in the process of "Start the motor", it raises the signal (r) which is the output of the terminal CM1. The circuit 61 which receives these signals (q) and (r) causes the motor 63 to turn in the direction to move the lens unit 75 from the position W to the position T. In the next process of "Position T?", the CPU 60 turns on the circuit 59 as stated above, checks the signal levels at the terminals TWW and TWT, and selecting NO unless the switch 56 has not been closed, thereby repeating these procedures. When the lens unit 75 is driven from the position W to reach the position T, the switch 56 is closed, the signal level at the terminal TWT is changed into L level, the CPU 60 detects the fact that the lens unit 75 reaches the position T to turn off the circuit 59, and changes the signal (r) into L level in the next process of "Stop the motor", thereby stopping the motor 63 and the operation returning to that which is just after the interruption is effected in the process of "RTI".

In the rear lid opening operation with the lens unit 75 set to the position W as stated above, the focal length selecting mechanism does not work at all, thereby the lens unit 75 not moving, so we attempt to start the rear lid opening operation as shown in FIG. 22 again in the present state in which the lens unit 75 is set to the position T. When the rear lid is opened again, the signal level at the terminal INT1 is changed into L level, thereby the rear lid-opening operation being started. In the process of "Position T?", the CPU 60 checks the states of the switches 55 and 56 in the same manner as described above, recognizes that the lens unit 75 is set to the position T, and selects YES. In the process of "Reverse the switch flag", then, the CPU 60 sets to the position W the switch which is renewed to the position T in the operation switching from the position T in the operation switching from the position W to the position T, in the process of "Position T→W", it reverses the signal level of the signals (q) into H level, and in the next process of "Start the motor", it changes the signal (r) into H level to cause the motor 63 to rotate in the direction that the lens unit 75 moves from the position T to the position W. In the process of "Position W?", then, the CPU 60 controls the circuit 59, checks the states of the switches 55 and 56, and repeats the operation to select NO until the switch 55 is closed. When the lens unit 75 is driven from the position T to reach the position W, the switch 55 is closed, and the signal level at the terminal TWW is changed into L level, thereby the CPU 60 detects the fact that the lens unit 75 reaches the position W. Then, YES is selected and the CPU 60 reverses the signal level of the signal (r) into L level to stop the motor 63, and the operation returns to that which is just after the interruption is applied in the process of "RTI". In other words, if the rear lid is opened while the rearmost surface of the converter lens unit 75 is located at the position T where the said surface draws nearest to the film aperture surface, the lens unit 75 is automatically retreated toward the position W which is farther from the said film aperture surface by utilizing the focal length selecting mechanism, thereby the rearmost surface of the lens unit 75 being protected from direct touching with a finger or adhesion of dust and dirt.

If the rear lid is again closed under this state, no interruption is effected, because the signal level at the terminal INT1 is reversed from the L level to the H level, and the focal length selecting mechanism does not work at all. In other words, the lens unit 75 is reset and kept to the initial state.

In the branching process of "Is flag switch for position T?" in FIG. 23, the case of selecting NO is alone described. The operation to be effected after YES is selected is almost similar with the said case, with the driving direction of the lens unit 75 being reversed from that described above.

The operation of the other embodiment of the fifth apparatus of this invention by referring to FIGS. 24 to 26. Assume that the device shown in FIG. 24 is set to the initial state. First of all, a description is effected as to the ordinary driving operation from the position W to the position T, therefore the rear lid being closed. Supposing that the switch 88 is pressed at the point of time, for example, t1 in FIG. 26, the signal (j) is changed into L level, and the pulse (k) as a starting signal is produced from the circuit 87a. Although the following description is not shown in the timing chart, the signal (a) is of L level since the rear lid is closed while the signal (b) is of H level, thereby the AND gate 89a being in the operation mode. So, the pulse (k) is generated in a form of the pulse (l) from the OR gate 90a by way of the AND gate 89a. When receiving the pulse (l), both the T-FF 92 and RS-FF 93 get rid of their reset state to reverse their outputs, thereby the signals (h) being H level, (i) being L level, and (g) being H level. As a result, both the NAND gates 91a and 91b enter the operation mode, and the signal (T) which is now L level as the signal (h) is reversed is connected to the contact points 98b and 98a of the switch 98 while the signal (i) connects the contact point 99b to the contact point 99c, thereby the motor 97 driving the lens unit 94 from the position W to the position T. Thereafter, the lens unit 94 abut against the actuator of the switch 95 to close the switch 95 (as shown in FIG. 24), thereby the signal (d) being reversed from H level to L level and the output pulse from the circuit 87c being applied to the input terminal OFF of the RS-FF 93 as the pulse (f) by way of the OR gate 90b at this reversing point. The RS-FF 93 is reset and the signal (g) is changed into the L level while the signal (W) maintains the H level. The signal (T) is reversed to the H level to connect the contact point 98b of the switch 98 to the contact point 98c, both terminals of the motor 97 are grounded, and power supply 100 is shut off, thereby the motor 97 which is short-circuited through the said grounding procedure acting as an elecromagnetic brake. The foregoing has described ordinary driving operation.

There is given hereunder a description of the rear lid opening operation shown in FIG. 25 which starts from the state mentioned above. Assuming that the rear lid is opened at the timing T0, the signal (a) is raised while the signal (b) is lowered so that the AND gate 89a is set to a prohibited state to prohibit reception of the pulse (k). As shown in FIG. 26, therefore, no pulse (l) is generated by pressing the switch 88 in the timing t4 to t6 after the point T0 where the rear lid is opened.

When reverting to FIG. 25, the circuit 87a generates the pulse(c) at the timing T0 and the lens unit 94 is not located at the position T so that the signal (e) is H level, and since the AND gate 89b is in the operation mode, the opening pulse (c) is changed into the output pulse (c'), and is then changed into the pulse (l) by way of the OR gate 90a, thereafter being given to the T-FF 92 and the RS-FF 93. As a result, the signal (g) is changed to an H level one to set the NAND gates 91a and 91b to the operating mode and to reverse the signals (h) and (i) into L level and H level, respectively, thereby the signals (T) and (W) maintaining the H level and being reversed to the L level, respectively. Then, the contact point 99b is connected to the contact point 99a, the contact point 98b is connected to the contact point 98c, and the motor 97 rotates in the direction reverse to that stated above and drives the lens unit 94 in the direction from the position T to the position W. The signal (d) is raised, therefore, since the pressure to the actuator of the switch 95 is removed in the timing ts and the switch 95 is turned off. Then, the lens unit 94 contacts the actuator of the switch 96, and the pulse (f) is generated at the point of time T1, thereby the motor 97 being stopped. When the rear lid is opened, as described above, the AND gate 89a prohibits outputting of the switch 88, and as soon as the rear lid is opened when the lens unit 94 is located at the position T, the lens unit 94 is automatically driven to the position W where more safety is assured, the existing focal length selecting mechanism functions in the same manner as in the first embodiment.

When the lens unit 94 is located at the position W, the switch 96 is closed and the signal (e) is of the L level, thereby the AND gate 89b being in the prohibiting mode. When the rear lid is opened at the timing T0, the signal (a) is reversed to H level and the signal (b) is lowered to allow the pulse (c) to be generated at the timing T0, but since the AND gate 89b is in the prohibiting mode, the pulse (c) is not generated in the form of either pulse (c') or pulse (l), thereby the lens unit 94 not being moved at all. In other words, the focal length selecting mechanism does not work, because the lens unit 94 is located at the position W where it is almost free from fear for being smeared by opening the rear lid.

One of the advantages of the embodiments is that when the rear lid is opened while the lens unit 75 or 94 is located at the position T where it is so near the film aperture surface that it may be exposed to fear for smearing, the existing focal length selecting mechanism automatically drives the converter lens unit 75 or 94 to the position W where more safety is assured as stated above, thereby protecting the rearmost surface of the lens unit 75 or 94 from being smeared by fingerprints to be produced when it is touched with the finger or from adhesion of dust and dirt, and additionally, eliminating necessity to impart excessive force to the mechanical section of the said focal length selecting mechanism, resulting in protection of the mechanical section from damage and of the positioning accuracy of the lens units 75 and 94 from being degraded.

Since the main lens unit which is located at the front part of the photographing optical axis of the lens unit 75 or 94 is projected in the more front part in the position T, the main lens unit thus projected may become an obstacle when placing the camera body on a desk or similar surface for, say, replacing a film. The other advantage of this embodiment is, however, that the main lens unit is designed to automatically move in the camera body along the photographing optical axis when the rear lid is opened, thereby the operability being enhanced when replacing a film.

Another advantage is that since the switches 54 and 88 are prohibited from generating output while the rear lid is opened, the lens units 75 and 94 are not driven, which means that the lens units 75 and 94 are set to the safe position W when the rear lid is opened in order to, for example, replace a film, thereby not being driven to the position T where they are exposed to fear of smearing by erroneous or intentional operation of the switches 54 and 88.

Another advantage is that no power is consumed for useless purposes, since the focal length selecting mechanism does not work while the lens unit 75 or 94 is located at the safe position W.

Another advantage is that no power is consumed for useless purposes, either, since the pull-up power +V is supplied to the resistances 57 and 58 only when the circuit 59 is used for identifying the states of the switches 55 and 96 and the switches 56 and 95.

Another advantage is that the one embodiment of the fifth apparatus requires only a procedure to rewrite a program for commanding the operational sequence of the CPU 60 and that an existing focal length selecting mechanism is used as it is, not needing any additional components, thereby it being constructed with extremely low costs.

When the rear lid is closed again, for example, after the rear lid opening operation is completed, the lens units 75 and 94 may be constructed to be reset to an original lens location which is stored in the memory.

The switches 54 and 88 is not be limited to a monopole one, and a seesaw switch and other two-pole type may be used instead thereof. In such a case, the switch flag in the one embodiment of the fifth apparatus and the T-FF 92 in the other embodiment of the fifth apparatus may be omitted.

When simplifying the program, only a switch necessary for the purpose of the processes of "Position T?" and "Position W?" in FIGS. 22 and 23 may be checked, rather than checking both switches 55 and 56.

If there is some time allowance in the operation of the CPU 60, the rear lid opening operation and the selecting operation may be started by a method of polling to constantly monitor signal levels at the input terminal rather than depending upon interruption.

Moreover, this invention is applicable to zoom lenses and other variable focus optical systems, not limited to multi-focus cameras.

All the switches except the switches 56, 95, 55, 96, 98 and 99 may be optical switches or other non-contact type switches, not limited to mechanical switches. Conversely, the switches 98 and 99 may use an electro-magnetic relay if there is no problem in its operating time, not limited to the electronic switches.

The circuit 59 may be omitted, if power consumption by the resistances 57 and 58 is ignorable.

What is claimed is:

1. An apparatus for driving a moving lens barrel of a camer, said barrel supporting a photographing lens unit and retained mechanicall and slidably with a camera body between a first setting positiion located in a forward directiion of an optical axis of said lens unit and a second setting position located in a backward direction of said optical axis, comprising:
   a driving gear supported rotatably with a bearing shaft fixed to said camera body,
   a motor disposed at said camera body for driving said driving gear,
   a first connecting shaft disposed at a periphery of an end face of said driving gear,
   a second connecting shaft disposed at a rear end of said barrel,
   a spring member connected rotatably to said first connecting shaft at one end therof and connected roatably to said second connecting shaft at the other end thereof, and
   a connecting piece connected rotatably to said first connecting shaft at one end thereof and connected rotatably to said second connecting shaft at the other end thereof, at least one of said one end and said other end being connected to said connecting shaft so as to have clearance along both directions of said optical axis when said spring member is set in a natural lenght.

2. The apparatus of claim 1, in which said spring member comprises an elastic thin plate with a shape having a cirved portion projecting toward a side of said plate within a plane of said plate.

3. The apparatus of claim 1, in which said spring member comprises an elastic wire-like torsion spring with a V shape.

4. An apparatus for driving a moving leans barrel of a camera by a motor, said barrel supporting a photographing lens unit and retained mechanicaly and slidably with a camera body between a first setting position located in a forward direction of an optical axis of siad lens unit and a second setting position located in a backward direction of said optical axis, comprising:
   a first stopper disposed at said first setting position for stopping a movement of said barrel toward said first setting position,
   a second stopper disposed at said second setting position for stopping a movement of said barrel toward said second setting position,
   a detecting means for detecting that said barrel is positioned in the vincinity of one of said first setting position and said second setting position,
   an intermitting means or intermitting of a power supply to said motor, and
   a controlling means for receiving an output of said detecting means and for controlling said intermitted at regular cycles after a timing at which said cycle gradually decreasing according to a lapse of time from said timing, and said power supply is cut off.

5. An apparatus for driving a moving lens barrel of a camera by a motor, said barrel supporting a photographing lens unit and retained mechanically and slidably with a camera body between a first setting position located in a forward direction of an optical axis of said lens unit and a second setting position located in a backward direction of said optical axis, comprising:
   a selecting means for outputting an order to switch selectively a position of said barrel between said first setting position and said second setting position,
   a judging means for receiving said order and for outputting a driving information relating to whether said order belongs to said driving direction toward said first setting position or said driving direction toward said second setting position,
   a detecting means for detecting that said barrel is positioned at one of said first setting position and said second setting position,
   a first controlling means for controlling said motor such that said barrel is driven to one of said first setting position and said second setting position,
   a timing means for timing a predetermined switching time from a timing at which said barrel starts to be driven to said second setting position by said first controlling means, based on a direction information by which said barrel is driven toward said second setting position, and
   a second controlling means for controlling said first controlling means such that said barrel is returned to said first settiing position when discriminating that said barrel does not reach to said second setting position at the time at which said switching time is received from said timing means.

6. An apparatus for driving a moving lens barrel of a camera by a motor, said barrel supporting a photographing lens unit and retained mechanically and slidably with a camera body between a first setting position located in a forward direction of an optical axis of said lens unit and a second setting position located in a backward direction of said optical axis, comprising:
   a first stipper disposed at said dirst setting position for stopping a movement of sid barrel toward said first setting position,
   a second stopper disposed at said second setting position for stopping a movement of said barrel toward said second setting position,
   a detecting means for detecting that said barrel is positioned in the vicinity of one of said first setting position and said second setting position,
   an intermitting means for intermitting of a power supply to said motor, and
   a controlling means for receiving an output of said detecting means and for controlling said intermitting means such that said power supply is intermitted at regular cycles after a timing at which said controlling means receives said output, a time period of which a power is supplied to said motor in each of said cycles decreasing to a predetermined length after a predetermined lapse of time from said timing, and said power supply is cut off.

* * * * *